US010514754B2

(12) United States Patent
Tokubo

(10) Patent No.: US 10,514,754 B2
(45) Date of Patent: *Dec. 24, 2019

(54) RF BEAMFORMING FOR HEAD MOUNTED DISPLAY

(71) Applicant: Sony Interactive Entertainment Inc., Tokyo (JP)

(72) Inventor: Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,283

(22) Filed: Dec. 28, 2018

(65) Prior Publication Data
US 2019/0138087 A1 May 9, 2019

Related U.S. Application Data

(63) Continuation of application No. 15/283,138, filed on Sep. 30, 2016, now Pat. No. 10,209,771.

(51) Int. Cl.
G06F 3/01 (2006.01)
G06F 3/03 (2006.01)
A63F 13/332 (2014.01)
A63F 13/53 (2014.01)
A63F 13/213 (2014.01)
A63F 13/235 (2014.01)
A63F 13/327 (2014.01)
H04B 7/04 (2017.01)
(Continued)

(52) U.S. Cl.
CPC ............ *G06F 3/012* (2013.01); *A63F 13/211* (2014.09); *A63F 13/212* (2014.09); *A63F 13/213* (2014.09); *A63F 13/235* (2014.09); *A63F 13/25* (2014.09); *A63F 13/327* (2014.09); *A63F 13/332* (2014.09); *A63F 13/5255* (2014.09); *A63F 13/53* (2014.09); *G02B 27/017* (2013.01); *G02B 27/0172* (2013.01); *G06F 3/011* (2013.01); *G06F 3/0304* (2013.01); *H04B 7/04* (2013.01); *H04B 7/0617* (2013.01); *A63F 2300/8082* (2013.01); *G02B 2027/014* (2013.01); *G02B 2027/0138* (2013.01); *G02B 2027/0187* (2013.01); *G06F 2203/0384* (2013.01)

(58) Field of Classification Search
CPC ..... H04B 7/0417; G06F 3/012; G02B 27/017; G06T 19/003
See application file for complete search history.

(56) References Cited

U.S. PATENT DOCUMENTS 4,348,186 A 9/1982 Harvey et al.
6,377,401 B1 * 4/2002 Bartlett .................. F41G 3/225
345/8

(Continued)

Primary Examiner — Kent W Chang
Assistant Examiner — Nathaniel P Brittingham
(74) Attorney, Agent, or Firm — Penilla IP, APC

(57) ABSTRACT

A method is provided, including the following method operations: receiving captured images of an interactive environment in which a head-mounted display (HMD) is disposed; receiving inertial data processed from at least one inertial sensor of the HMD; analyzing the captured images and the inertial data to determine movement of the HMD; using the movement of the HMD to adjust a beamforming direction of an RF transceiver towards the HMD.

20 Claims, 19 Drawing Sheets

(51) Int. Cl.
    *A63F 13/25*      (2014.01)
    *A63F 13/211*     (2014.01)
    *A63F 13/5255*    (2014.01)
    *A63F 13/212*     (2014.01)
    *G02B 27/01*      (2006.01)
    *H04B 7/06*       (2006.01)

(56) References Cited

U.S. PATENT DOCUMENTS

| | | | |
|---|---|---|---|
| 6,724,915 B1* | 4/2004 | Toklu | G06T 7/248 |
| | | | 382/103 |
| 7,117,014 B1* | 10/2006 | Van Rensburg | H04B 7/0695 |
| | | | 455/561 |
| 7,720,229 B2 | 5/2010 | Duraiswami et al. | |
| 7,973,702 B2* | 7/2011 | Rofougaran | A63F 13/235 |
| | | | 342/146 |
| 8,310,656 B2* | 11/2012 | Zalewski | A63F 13/06 |
| | | | 356/28 |
| 8,781,151 B2* | 7/2014 | Marks | A63F 13/06 |
| | | | 345/156 |
| 9,277,365 B1* | 3/2016 | Wilden | H04W 4/029 |
| 9,379,793 B2* | 6/2016 | Inoue | H04B 7/0456 |
| 9,552,648 B1* | 1/2017 | Zhang | G06K 9/00771 |
| 10,209,771 B2* | 2/2019 | Tokubo | G06F 3/012 |
| 2002/0101612 A1 | 8/2002 | Lauper et al. | |
| 2002/0181115 A1 | 12/2002 | Massof et al. | |
| 2004/0193413 A1 | 9/2004 | Wilson et al. | |
| 2005/0001981 A1 | 1/2005 | Anderson et al. | |
| 2005/0008256 A1* | 1/2005 | Uchiyama | G06T 7/80 |
| | | | 382/291 |
| 2005/0108646 A1 | 5/2005 | Willins et al. | |
| 2006/0119572 A1 | 6/2006 | Lanier | |
| 2007/0024579 A1 | 2/2007 | Rosenberg | |
| 2007/0049374 A1 | 3/2007 | Ikeda et al. | |
| 2007/0189551 A1 | 8/2007 | Kimijima | |
| 2008/0159544 A1 | 7/2008 | Kim | |
| 2008/0215184 A1 | 9/2008 | Choi et al. | |
| 2008/0297437 A1* | 12/2008 | Takahashi | G02B 27/017 |
| | | | 345/8 |
| 2009/0022368 A1 | 1/2009 | Matsuoka et al. | |
| 2009/0046152 A1* | 2/2009 | Aman | A63B 24/0021 |
| | | | 348/157 |
| 2009/0099836 A1 | 4/2009 | Jacobsen et al. | |
| 2009/0103593 A1* | 4/2009 | Bergamo | H04B 1/707 |
| | | | 375/146 |
| 2009/0222173 A1* | 9/2009 | Wisniowski | H01Q 1/3208 |
| | | | 701/49 |
| 2009/0225001 A1 | 9/2009 | Biocca et al. | |
| 2010/0026714 A1 | 2/2010 | Utagawa | |
| 2010/0075683 A1* | 3/2010 | Johansson | H04B 7/15507 |
| | | | 455/446 |
| 2010/0104054 A1* | 4/2010 | Scott | H01Q 3/04 |
| | | | 375/347 |
| 2011/0141011 A1 | 6/2011 | Lashina et al. | |
| 2011/0194516 A1* | 8/2011 | Aiba | H04L 1/0026 |
| | | | 370/329 |
| 2012/0032874 A1 | 2/2012 | Mukawa | |
| 2012/0093320 A1 | 4/2012 | Flaks et al. | |
| 2012/0093338 A1 | 4/2012 | Levi et al. | |
| 2012/0097012 A1 | 4/2012 | Kurihara et al. | |
| 2012/0105473 A1 | 5/2012 | Bar-Zeev et al. | |
| 2012/0106632 A1 | 5/2012 | Zhang | |
| 2012/0154536 A1 | 6/2012 | Stoker et al. | |
| 2012/0249416 A1* | 10/2012 | Maciocci | G06F 3/011 |
| | | | 345/156 |
| 2012/0262558 A1* | 10/2012 | Boger | G02B 27/0093 |
| | | | 348/61 |
| 2012/0268563 A1 | 10/2012 | Chou et al. | |
| 2012/0306850 A1* | 12/2012 | Balan | G06T 19/006 |
| | | | 345/419 |
| 2012/0308057 A1 | 12/2012 | Edwards et al. | |
| 2013/0083173 A1* | 4/2013 | Geisner | G06F 3/013 |
| | | | 348/51 |
| 2013/0101230 A1* | 4/2013 | Holeva | B66F 9/122 |
| | | | 382/202 |
| 2013/0169626 A1 | 7/2013 | Balan et al. | |
| 2013/0304479 A1 | 11/2013 | Teller et al. | |
| 2013/0335405 A1* | 12/2013 | Scavezze | G06T 19/20 |
| | | | 345/419 |
| 2014/0006026 A1 | 1/2014 | Lamb et al. | |
| 2014/0023995 A1 | 1/2014 | Jones et al. | |
| 2014/0029775 A1 | 1/2014 | Anderson | |
| 2014/0055352 A1* | 2/2014 | Davis | G06F 3/017 |
| | | | 345/156 |
| 2014/0125698 A1* | 5/2014 | Latta | G06F 3/011 |
| | | | 345/633 |
| 2014/0162777 A1* | 6/2014 | Hsu | A63F 13/00 |
| | | | 463/31 |
| 2014/0211731 A1* | 7/2014 | Inoue | H04B 7/0456 |
| | | | 370/329 |
| 2014/0361977 A1* | 12/2014 | Stafford | G02B 27/0093 |
| | | | 345/156 |
| 2014/0364208 A1* | 12/2014 | Perry | G06F 3/14 |
| | | | 463/31 |
| 2014/0364212 A1 | 12/2014 | Osman et al. | |
| 2015/0009348 A1* | 1/2015 | Vartanian | H04N 5/23206 |
| | | | 348/211.3 |
| 2015/0065077 A1* | 3/2015 | Kim | H04W 4/90 |
| | | | 455/404.1 |
| 2015/0071524 A1* | 3/2015 | Lee | G06K 9/00208 |
| | | | 382/154 |
| 2015/0097719 A1* | 4/2015 | Balachandreswaran | |
| | | | G01B 11/002 |
| | | | 342/147 |
| 2015/0264583 A1* | 9/2015 | Sundstrom | H04W 16/28 |
| | | | 342/373 |
| 2015/0269780 A1* | 9/2015 | Herman | G06T 13/00 |
| | | | 345/633 |
| 2015/0318610 A1 | 11/2015 | Lee et al. | |
| 2015/0352437 A1* | 12/2015 | Koseki | A63F 13/212 |
| | | | 463/31 |
| 2015/0363976 A1* | 12/2015 | Henson | H04N 13/279 |
| | | | 345/419 |
| 2016/0042221 A1* | 2/2016 | Mei | G06K 9/0061 |
| | | | 382/103 |
| 2016/0093108 A1* | 3/2016 | Mao | A63F 13/42 |
| | | | 345/633 |
| 2016/0121211 A1* | 5/2016 | Ladd | A63F 13/355 |
| | | | 463/33 |
| 2016/0150418 A1* | 5/2016 | Kang | H04W 16/28 |
| | | | 455/422.1 |
| 2016/0209655 A1 | 7/2016 | Riccomini et al. | |
| 2016/0266386 A1* | 9/2016 | Scott | G06F 3/013 |
| 2016/0292924 A1* | 10/2016 | Balachandreswaran | |
| | | | G06T 19/006 |
| 2016/0316336 A1* | 10/2016 | Krenz | G09B 19/003 |
| 2016/0341959 A1* | 11/2016 | Gibbs | G06K 9/00671 |
| 2016/0359596 A1* | 12/2016 | Wild | H04B 7/0695 |
| 2016/0378204 A1* | 12/2016 | Chen | G01C 3/08 |
| | | | 345/156 |
| 2017/0045941 A1* | 2/2017 | Tokubo | G06F 3/167 |
| 2017/0046891 A1* | 2/2017 | Trivelpiece | G07C 9/00111 |
| 2017/0084074 A1* | 3/2017 | Hwang | G06T 15/205 |
| 2017/0178352 A1* | 6/2017 | Harmsen | G06T 7/579 |
| 2017/0206691 A1* | 7/2017 | Harrises | G06T 11/60 |
| 2017/0206712 A1* | 7/2017 | Petrovskaya | G06T 19/006 |
| 2017/0238297 A1* | 8/2017 | Benjebbour | H04B 7/0404 |
| | | | 370/329 |
| 2017/0277253 A1* | 9/2017 | Mullen | G06F 3/01 |
| 2017/0288755 A1* | 10/2017 | Byun | H04B 17/00 |
| 2017/0295446 A1* | 10/2017 | Thagadur Shivappa | |
| | | | G06F 3/011 |
| 2017/0317729 A1* | 11/2017 | Kobayashi | H04B 7/0617 |
| 2017/0331670 A1* | 11/2017 | Parkvall | H04W 52/0274 |
| 2017/0339575 A1* | 11/2017 | Kim | G01S 3/14 |
| 2017/0359549 A1* | 12/2017 | Baran | H04N 5/772 |
| 2017/0371353 A1* | 12/2017 | Millinger, III | G05D 1/101 |
| 2018/0075820 A1* | 3/2018 | Hicks | G09G 5/363 |
| 2018/0093185 A1* | 4/2018 | Black | A63F 13/537 |

(56) References Cited

U.S. PATENT DOCUMENTS

| | | | |
|---|---|---|---|
| 2018/0095529 A1* | 4/2018 | Tokubo | G06F 3/012 |
| 2018/0096519 A1* | 4/2018 | Tokubo | G06F 1/1626 |
| 2019/0044584 A1* | 2/2019 | Lee | H04B 7/0417 |

* cited by examiner

RF BEAMFORMING FOR HEAD MOUNTED DISPLAY

BACKGROUND

1. Field of the Disclosure

The present disclosure relates to predictive RF beamforming for transmission of data to head mounted displays (HMDs), and related methods, apparatus, and systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

A head-mounted display (HMD) provides an immersive virtual reality experience, as the HMD renders a real-time view of the virtual environment in a manner that is responsive to the user's movements. The user wearing an HMD is afforded freedom of movement in all directions, and accordingly can be provided a view of the virtual environment in all directions via the HMD. However, the processing resources required to generate the video for rendering on the HMD are considerable and therefore handled by a separate computing device, such as a personal computer or a game console. The computing device generates the video for rendering to the HMD, and transmits the video to the HMD.

To provide a high fidelity experience, it is desirable to provide high quality video (e.g. at high resolution and frame rate). However, such video entails transmission of large amounts of data, requiring high bandwidth and a stable connection. Thus, current systems for HMD rendering use a wired connection to transfer data from the computing device to the HMD, as this affords the requisite bandwidth and connection stability. However, the presence of a wire that connects to the HMD can be bothersome to the user, as it may contact the user and detract from the immersive experience of using the HMD. Furthermore, the wired connection may inhibit the user's freedom of movement, as the user must be mindful of not over-extending the wire, and must avoid any movement which might cause disconnection or damage the wire. Furthermore, the presence of the wire presents a tripping hazard, which is amplified by the fact that the user cannot see the real environment while using the HMD.

It is in this context that implementations of the disclosure arise.

SUMMARY

Implementations of the present disclosure include devices, methods and systems relating to RF beamforming for a head mounted display.

In some implementations, a method is provided, including the following method operations: receiving captured images of an interactive environment in which a head-mounted display (HMD) is disposed; receiving inertial data processed from at least one inertial sensor of the HMD; analyzing the captured images and the inertial data to determine a predicted future location of the HMD; using the predicted future location of the HMD to adjust a beamforming direction of an RF transceiver towards the predicted future location of the HMD.

In some implementations, analyzing the captured images and the inertial data includes identifying movement of the HMD, the predicted future location of the HMD being determined using the identified movement of the HMD.

In some implementations, identifying movement of the HMD includes determining a motion vector of the HMD, the predicted future location of the HMD being determined by applying the motion vector of the HMD to a current location of the HMD.

In some implementations, a magnitude of the motion vector identifies a speed of the movement of the HMD, and wherein a direction of the motion vector identifies a direction of the movement of the HMD.

In some implementations, the method further includes: adjusting an angular spread of the RF transceiver based on the speed of the movement of the HMD.

In some implementations, the angular spread increases with increasing speed of the movement of the HMD.

In some implementations, identifying movement of the HMD includes identifying translational movement and/or rotational movement of the HMD; wherein determining the motion vector includes determining an acceleration of the translational movement and/or the rotational movement.

In some implementations, the RF transceiver includes a phased array of RF emitters; wherein adjusting the beamforming direction of the RF transceiver includes generating transceiver control data that is configured to cause adjustment of a phase or amplitude of at least one of the RF emitters of the phased array.

In some implementations, the at least one inertial sensor of the HMD includes one or more of an accelerometer, a gyroscope, or a magnetometer.

In some implementations, the HMD includes a plurality of lights; wherein analyzing the captured images includes identifying one or more of the plurality of lights in the captured images.

In some implementations, a system is provided, including: a head-mounted display (HMD), the HMD having at least one inertial sensor configured to generate inertial data; a camera configured to capture images of an interactive environment in which the HMD is disposed; an RF transceiver; a computer configured to analyze the captured images and the inertial data to determine a predicted future location of the HMD, and use the predicted future location of the HMD to adjust a beamforming direction of the RF transceiver towards the predicted future location of the HMD.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 2A-1 and 2A-2 illustrate a head-mounted display (HMD), in accordance with an embodiment of the disclosure.

DETAILED DESCRIPTION

The following implementations of the present disclosure provide devices, methods, and systems relating to predictive RF beamforming for a head mounted display (HMD).

In various implementations, the methods, systems, image capture objects, sensors and associated interface objects (e.g., gloves, controllers, peripheral devices, etc.) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

Figure 1:
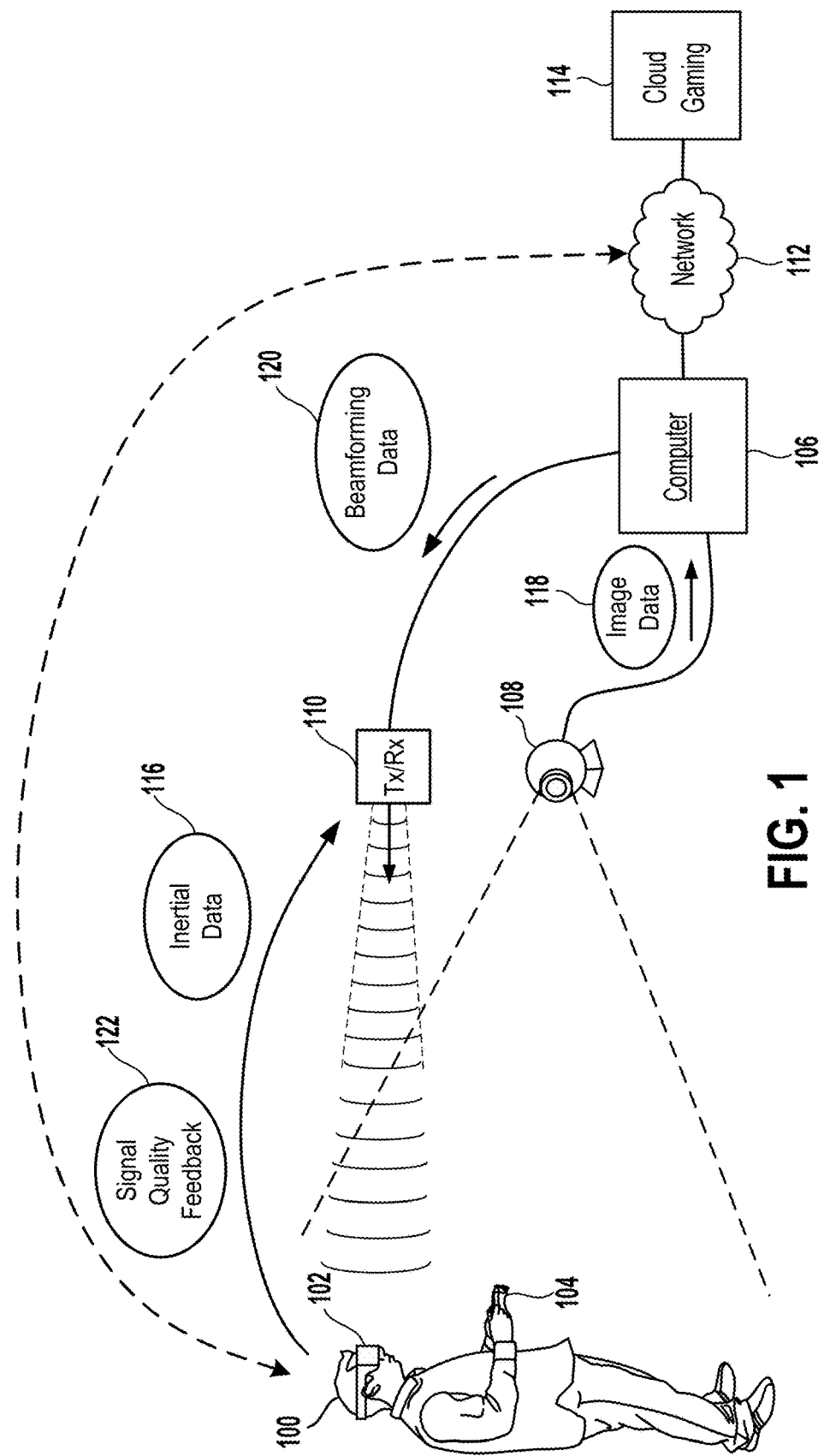
FIG. 1 illustrates a system for interaction with a virtual environment via a head-mounted display (HMD), in accordance with an embodiment of the disclosure.

FIG. 1 illustrates a system for interaction with a virtual environment via a head-mounted display (HMD), in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In the illustrated embodiment, the HMD 102 is wirelessly connected to a computer 106. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. A transceiver 110 is configured to wirelessly transmit the video and audio from the video game to the HMD 102 for rendering thereon. The transceiver 110 includes a transmitter for wireless transmission of data to the HMD 102, as well as a receiver for receiving data that is wirelessly transmitted by the HMD 102.

In some implementations, the HMD 102 may also communicate with the computer through alternative mechanisms or channels, such as via a network 112 to which both the HMD 102 and the computer 106 are connected.

The user 100 may operate an interface object 104 to provide input for the video game. Additionally, a camera 108 can be configured to capture images of the interactive environment in which the user 100 is located. These captured images can be analyzed to determine the location and movements of the user 100, the HMD 102, and the interface object 104. In various implementations, the interface object 104 includes a light which can be tracked, and/or inertial sensor(s), to enable determination of the interface object's location and orientation.

The way the user interfaces with the virtual reality scene displayed in the HMD 102 can vary, and other interface devices in addition to interface object 104, can be used. For instance, various kinds of single-handed, as well as two-handed controllers can be used. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network 112 with a cloud gaming provider 114. In such an implementation, generally speaking, the cloud gaming provider 114 maintains and executes the video game being played by the user 102. The computer 106 transmits inputs from the HMD 102, the directional interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the interface object 104.

In some embodiments, the HMD 102, interface object 104, and camera 108, may themselves be networked devices that connect to the network 112, for example to communicate with the cloud gaming provider 114. In some implementations, the computer 106 may be a local network device, such as a router, that does not otherwise perform video game processing, but which facilitates passage of network traffic. The connections to the network by the HMD 102, interface object 104, and camera 108 may be wired or wireless.

Additionally, though embodiments in the present disclosure may be described with reference to a head-mounted display, it will be appreciated that in other embodiments, non-head mounted displays may be substituted, including without limitation, portable device screens (e.g. tablet, smartphone, laptop, etc.) or any other type of display that can be configured to render video and/or provide for display of an interactive scene or virtual environment in accordance with the present embodiments.

The amount of data, especially in the form of video data (e.g. including image data and audio data), that must be transmitted to the HMD to provide a high quality user experience when viewing a virtual environment is quite large. For this reason, current HMD technology requires a wired connection between the computer which generates the video data, and the HMD. However, as noted above, a wired connection to the HMD detracts from the user's freedom of movement, degrading the otherwise immersive experience that can be so effectively rendered through an HMD.

Providing a wireless connection that is capable of reliably transmitting the amount of data required for a high quality experience requires overcoming problems in terms of providing a high signal-to-noise ratio for high data bandwidth while also maintaining high connection stability to the HMD as it moves in accordance with movements of the user. To accomplish this, implementations of the present disclosure provide for wireless data transmission to the HMD using predictive beamforming. That is, in some implementations, tracked movement of the HMD is analyzed to predict future locations of the HMD, and beamforming is used to predictively steer an RF signal towards the predicted future locations of the HMD. RF signal strength is thereby maintained by steering the RF signal in an anticipatory manner so as to better track the HMD's location.

For purposes of ease of description in the present disclosure, reference is made to the actual or predicted location of the HMD as a location in the real-world space towards which an RF signal should be directed. However, it should be appreciated that the location of the HMD may more specifically refer to a particular location on, within, or relative to, the HMD, such as the location of a receiver antenna that is part of the HMD, a location of the display portion of the HMD, a center of the HMD, etc.

With continued reference to FIG. 1, an overview of a procedure for predictive beamforming for data transmission to an HMD is shown, in accordance with implementations of the disclosure. It should be appreciated that the location of the HMD 102 can be tracked using any variety of technologies. In the illustrated implementation, the HMD 102 transmits inertial data 116 generated from one or more inertial sensors of the HMD to the computer 106. Further, the computer 106 receives captured image data 118 from the camera 110, which is configured to capture images of the interactive environment in which the HMD 102 and the user 100 are disposed. The inertial data 116 and/or the image data 118 are analyzed by the computer 106 to identify and track the HMD 102 and its location, orientation, and movements.

A predicted future location of the HMD is determined using the tracked movements of the HMD 102. By way of example, a motion vector can be generated by the computer 106 based on the tracked movements of the HMD 102. This motion vector can be applied to the current location of the HMD 102 to predict the future location of the HMD. Using the predicted future location of the HMD, the computer 106 generates beamforming data 120 that is configured to direct the beamforming direction of the transceiver 110 towards the predicted future location of the HMD. By directing the beamforming direction of the transceiver in a predictive manner, a strong wireless signal can be maintained, as the movements of the HMD 102 will be anticipated and the beamforming direction of the signal will not lag such movements, but can move in a simultaneous and/or anticipatory manner with such movements of the HMD. In the present disclosure, reference is made to the beamforming parameters (e.g. direction and angular spread) of the transceiver 110. It will be appreciated that such beamforming parameters can be applied to either or both of the transmitter and the receiver which are parts of the transceiver. Broadly speaking, implementations focused on transmission of video data from the computer to the HMD may discuss beamforming in terms of transmission by the transceiver's transmitter. However, it should be appreciated that any such discussion of beamforming can also be applied to signal reception by the transceiver's receiver.

In some implementations, the camera 108 and the transceiver 110 are integrated in the same device, so that the camera and transceiver have a fixed spatial relationship to each other, and more specifically, the image capture by the camera and the RF beamforming by the transceiver are spatially known in relation to each other. In such implementations, the position of the HMD can be determined from captured images by the camera, and the beamforming by the transceiver can be appropriately directed towards the HMD without additional calibration being required.

In other implementations, the transceiver 110 and the camera 108 are separate devices which can be positioned in the local environment at different locations. In such implementations, a calibration may be performed to determine the spatial relationship of the image capture by the camera and the RF beamforming by the transceiver. In one implementation, this can be performed by analyzing captured images from the camera to determine the location of the HMD relative to the camera, and performing a test to determine the optimal beamforming direction for the determined location of the HMD, and correlating these pieces of information. Such a procedure may be performed for multiple locations of the HMD to achieve more accurate calibration results.

In some implementations, signal quality feedback 122 is provided from the HMD 102 to the computer 106, e.g. via the transceiver 110 or the network 112. The signal quality feedback 122 is indicative of the quality of the wireless transmission (e.g. signal strength, error rate, etc.), and provides information which can be used to evaluate whether the beamforming direction is being effectively steered towards the HMD 102 so as to provide sufficient data transmission rates.

Figures 1, 2A:
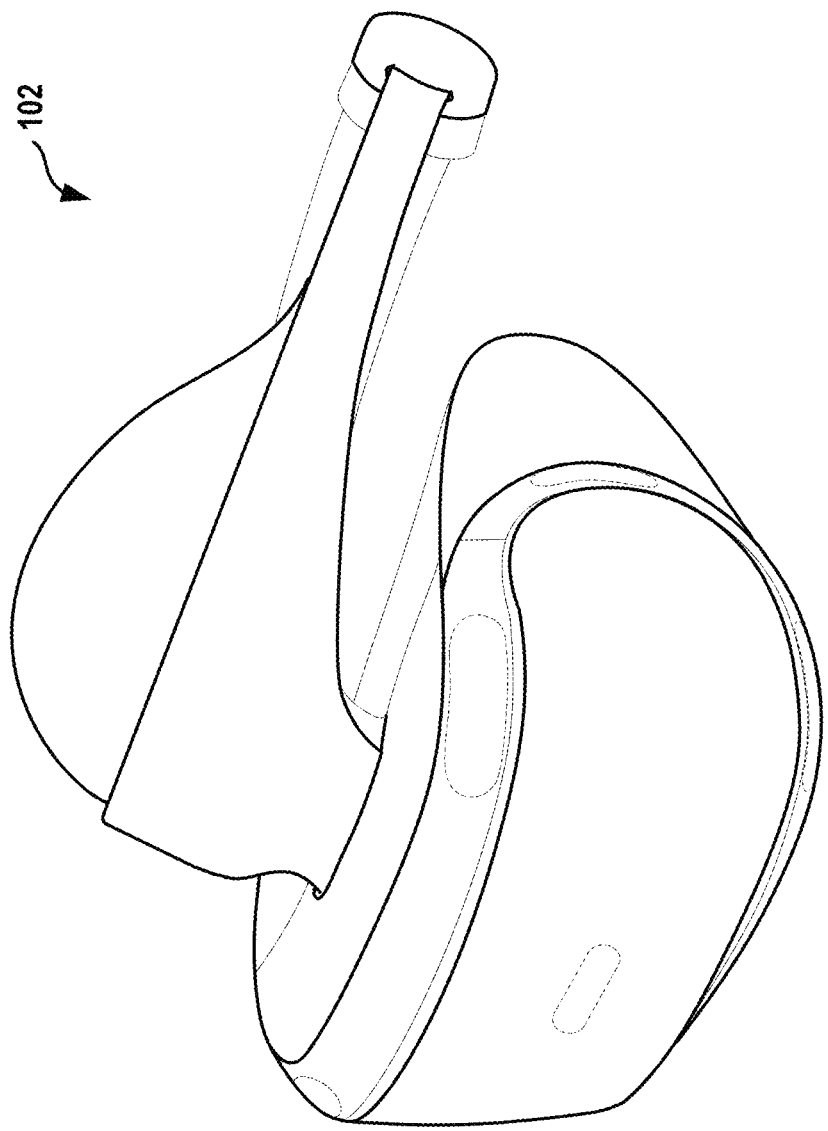
Figures 2, 2A:
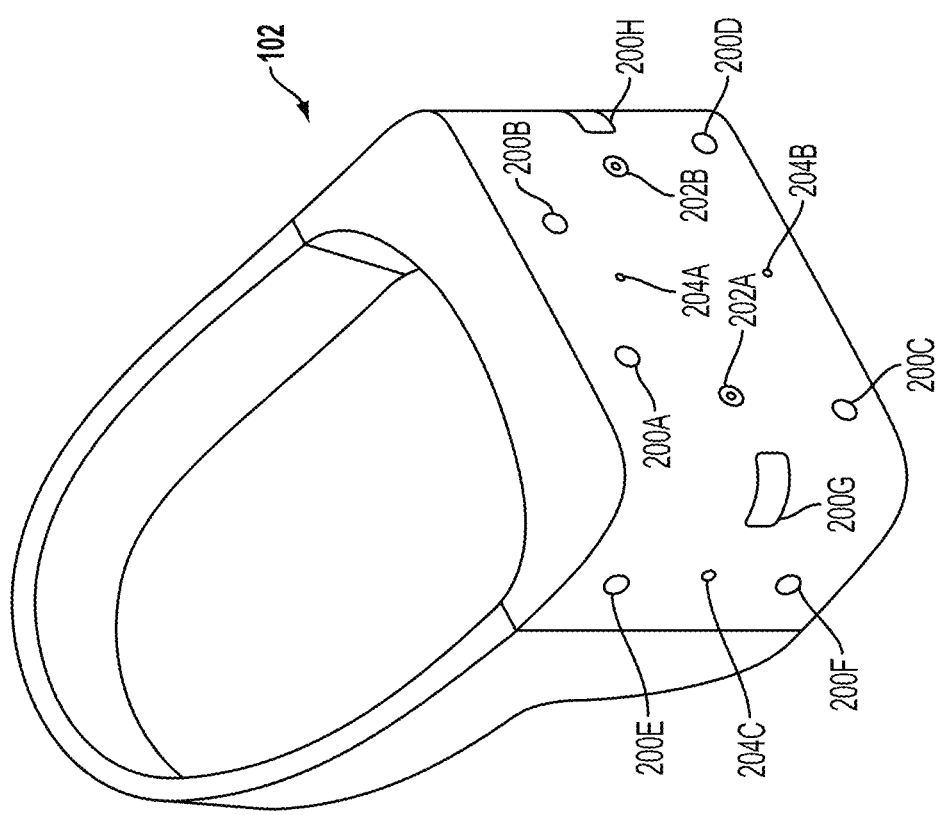

FIGS. 2A-1 and 2A-2 illustrate a head-mounted display (HMD), in accordance with an embodiment of the disclosure. FIG. 2A-1 in particular illustrates the Playstation® VR headset, which is one example of a HMD in accordance with implementations of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

Figure 3:
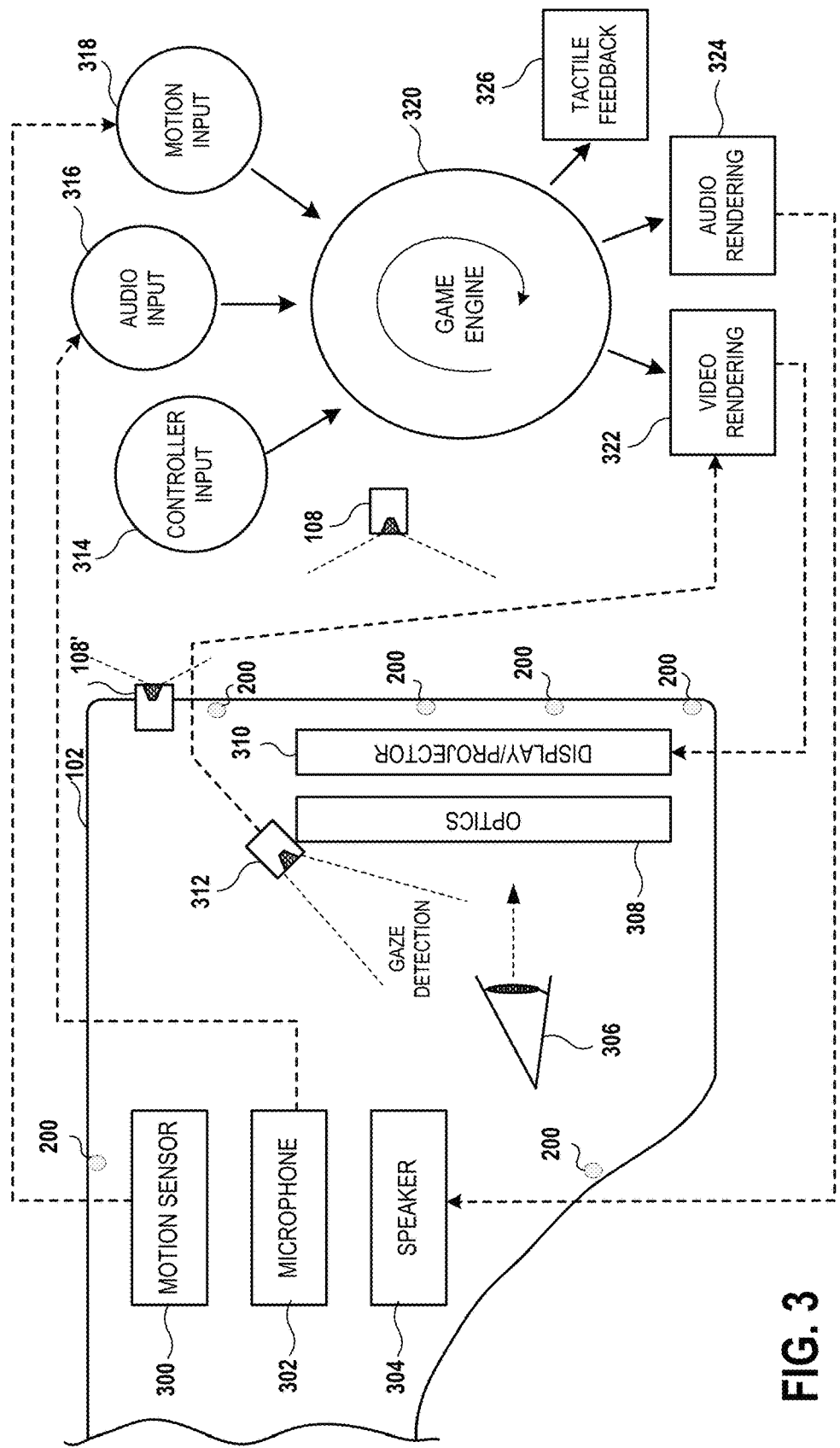
FIG. 3 conceptually illustrates the function of an HMD in conjunction with an executing video game, in accordance with an embodiment of the disclosure.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 2B:
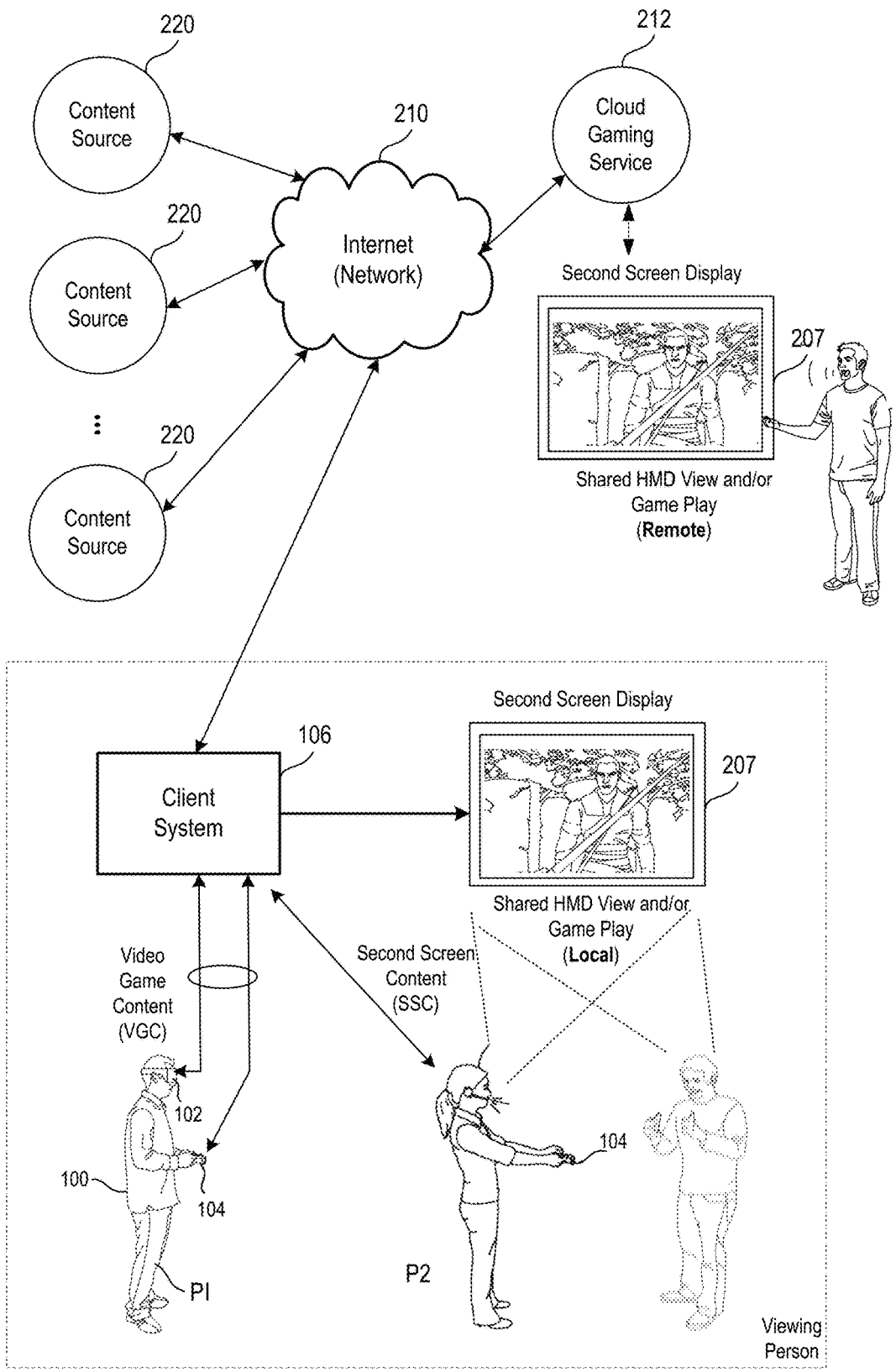
FIG. 2B illustrates one example of an HMD user interfacing with a client system, and the client system providing content to a second screen display, which is referred to as a second screen, in accordance with one embodiment.

FIG. 2B illustrates one example of an HMD 102 user 100 interfacing with a client system 106, and the client system 106 providing content to a second screen display, which is referred to as a second screen 207. The client system 106 may include integrated electronics for processing the sharing of content from the HMD 102 to the second screen 207. Other embodiments may include a separate device, module, connector, that will interface between the client system and each of the HMD 102 and the second screen 207. In this general example, user 100 is wearing HMD 102 and is playing a video game using a controller, which may also be directional interface object 104. The interactive play by user 100 will produce video game content (VGC), which is displayed interactively to the HMD 102.

In one embodiment, the content being displayed in the HMD 102 is shared to the second screen 207. In one example, a person viewing the second screen 207 can view the content being played interactively in the HMD 102 by user 100. In another embodiment, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 207 along with the VGC received from the HMD 102.

Accordingly, the interactivity by other users who may be co-located or remote from an HMD user can be social, interactive, and more immersive to both the HMD user and users that may be viewing the content played by the HMD user on a second screen 207. As illustrated, the client system 106 can be connected to the Internet 210. The Internet can also provide access to the client system 106 to content from various content sources 220. The content sources 220 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 220, or from a local user, or a remote user.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony PlayStation® Move motion controller) or directional interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as directional interface object 104. The tactile feedback may take the form of various kinds of tactile sensations, such as vibration feedback, temperature feedback, pressure feedback, etc. The directional interface object 104 can include corresponding hardware for rendering such forms of tactile feedback.

Figure 4:
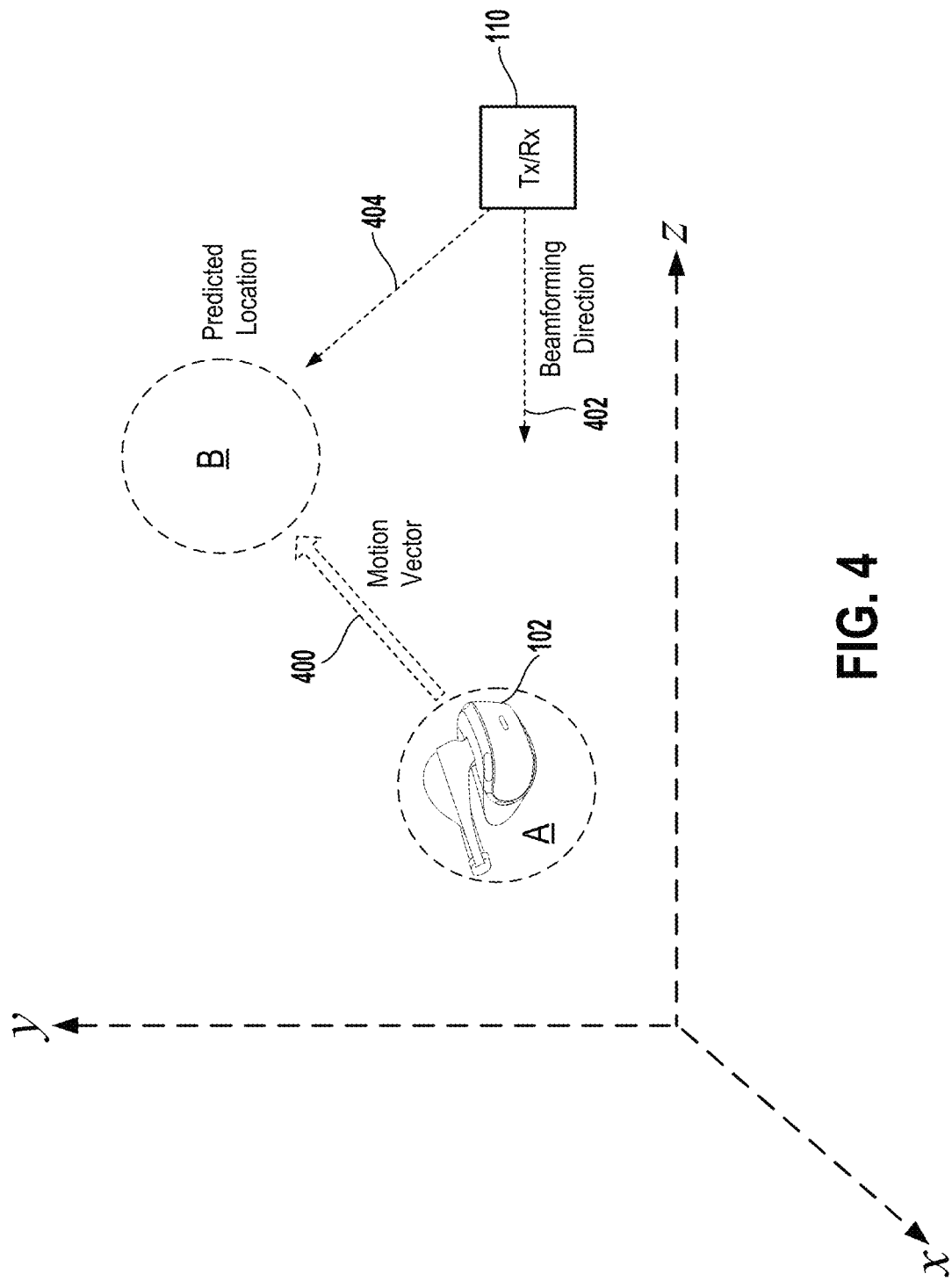
FIG. 4 illustrates adjustment of a beamforming direction of a transceiver based on prediction of a future location of an HMD, in accordance with implementations of the disclosure.

FIG. 4 illustrates adjustment of a beamforming direction of a transmitter based on prediction of a future location of an HMD, in accordance with implementations of the disclosure. In the illustrated implementation, the HMD 102 is shown in a three-dimensional space at an initial location A. The HMD 102 is capable of being moved in any direction under the control of a user, and as such it is desirable to steer the transmission beam towards the HMD 102.

In some implementations, a motion vector 400 is determined that is indicative of the current movement of the HMD 102. The current movement of the HMD can be determined from data generated by one or more inertial sensors of the HMD 102, as well as from analyzing captured images of the HMD (e.g. to track movement of lights or other recognizable portions of the HMD). In some implementations, the motion vector 400 is a velocity vector indicating both a spatial (three-dimensional (3D)) direction of the HMD's movement and a speed of the movement. The motion vector 400 can be applied to the current location A of the HMD to determine a predicted future location B of the HMD. That is, the future location B is predicted by extrapolating from the current location A using the direction and speed of movement of the HMD.

In some implementations, the motion vector 400 is itself predicted based on a determined acceleration of the HMD 102. That is the change in the velocity (including changes in the direction and speed) of the HMD can be determined from previously determined velocities of the HMD at earlier time points, and/or acceleration-sensing hardware (e.g. one or more accelerometers) defining the current acceleration of the HMD. This acceleration can be applied to the immediately preceding motion vector to determine the motion vector 400, which is applied to the current location to predict the future location as described above.

In the illustrated implementation, the initial beamforming direction 402 of the transceiver 110 is directed towards the initial location A of the HMD as shown. Based on the predicted future location B of the HMD, the beamforming direction is adjusted so as to be directed towards the future location B, as indicated by the updated beamforming direction 404. It will be appreciated that the adjustment of the beamforming direction is performed in a predictive manner that occurs before the actual future location of the HMD 102 is known. By anticipating the future location of the HMD, and predictively steering the beamforming direction accordingly, the wireless communication between the transceiver 110 and the HMD 102 can be improved, as the improved bandwidth that is provided via RF beamforming is maintained by continually steering its direction towards the HMD 102.

It will be appreciated that the beamforming direction is predictively adjusted, and therefore may or may not match the actual movement of the HMD to various extents. However, in accordance with implementations of the disclosure, a subsequent predicted location can be determined from a known current location that is determined based on the latest available information (e.g. via analysis of captured images from the camera). Thus, although a given adjusted beamforming direction may not specifically match the actual movement of the HMD, a subsequent adjustment of the beamforming direction will be based, at least in part, on the actual known location of the HMD, and therefore, the continual adjustment of the beamforming direction will not be susceptible to excessive deviation from the actual location of the HMD 102.

In some implementations, the beamforming update rate is on the order of about 10 to 100 milliseconds, and therefore the rate at which the future location of the HMD is predicted matches that of the beamforming update rate. In some implementations, the prediction rate is configured to match the frame rate of the camera, e.g. 60, 120, or 240 Hz in some implementations. Thus, the prediction will be to predict the location of the HMD at the next frame.

In some implementations, the inertial sensors of the HMD 102 may have better capabilities for detecting movement than the camera 108. For example, the inertial sensors may be sensitive to smaller movements than the camera 108, as the camera may be limited by its resolution (e.g. 720p or 1080p resolutions in some implementations). Furthermore, the sample rates of the inertial sensors may be significantly higher than the frame rate of the camera. For example, the camera may have a frame rate of about 60, 120 or 240 Hz, while the inertial sensors may have sample rates of over 1000 Hz. Further, the camera may require greater processing time (e.g. to analyze captured images) to determine location and/or movement. Thus, the inertial sensors can be more sensitive to movement with faster transient response that the camera 108.

However, the inertial sensors that detect relative movement can be prone to drift effects over time, and therefore are not exclusively relied upon to provide determinations of HMD location. Whereas, the camera 108 is better suited to provide accurate determinations of the location of the HMD, as fixed objects in the local environment can serve as anchors for purposes of determining the location of the HMD within the local environment.

Therefore, in various implementations, the use of inertial sensor data versus image capture data, either separately or in combination, can vary over time. For example, in some implementations, the sample rate of the inertial sensors may be N times faster than the frame rate of the camera. Thus, the predicted location of the HMD can be determined at a rate matching the sample rate of the inertial sensors, but with every Nth predicted location taking into account the image capture data from the camera (e.g. to verify the actual location of the HMD, on the basis of which the predicted location is determined). It will be appreciated that with each predicted location of the HMD, the beamforming direction of the transceiver 110 can be adjusted accordingly so as to be directed towards the predicted location of the HMD. Thus, the adjustments in beamforming direction may occur at a faster rate than the frame rate of the camera.

In related implementations, the rate at which the predicted locations of the HMD are determined does not necessarily match the sample rate of the inertial sensors, but is nonetheless faster than the frame rate of the camera, and/or faster than the rate at which predicted location determinations take into account captured image data. It will be appreciated that the sample rates of the inertial sensors and frame rates of the camera can be configurable within the operating ranges of these devices, and that such can be controlled as necessary to enable location prediction as discussed.

In some implementations, the faster sample rate of the inertial sensors is leveraged to improve determinations of the motion vector, for example by taking into account the acceleration of the HMD in real space based on the (additionally sampled, versus the captured images) inertial sensor data. The motion vector 400 may thus be better tailored to match the actual motion of the HMD, and thereby enable more accurate predicted locations of the HMD.

In some implementations, the time required to process and analyze captured image data from the camera is such that determinations of HMD location using the captured image data may lag the actual movements of the HMD to a noticeable extent. Thus, in some implementations, the captured image data is analyzed to determine the HMD's historical location, but not utilized as the current location for purposes of determining the predicted future location (based on inertial sensor data). Rather, the analysis of the captured image data is carried out and utilized to verify the historical location of the HMD, for example, against a previously predicted location of the HMD. The current prediction of HMD location may be adjusted based on such information if, for example, the previously predicted location of the HMD differs from the historical location by greater than a predefined amount.

Additionally, as discussed in further detail below, the prediction of HMD location may employ a prediction model. The accuracy of the prediction model may be evaluated based on comparing the historical location of the HMD, determined using the captured image data from the camera, against a previously predicted location for the same time. The prediction model may be adjusted based on such a comparison to provide improved results.

Figure 5A:
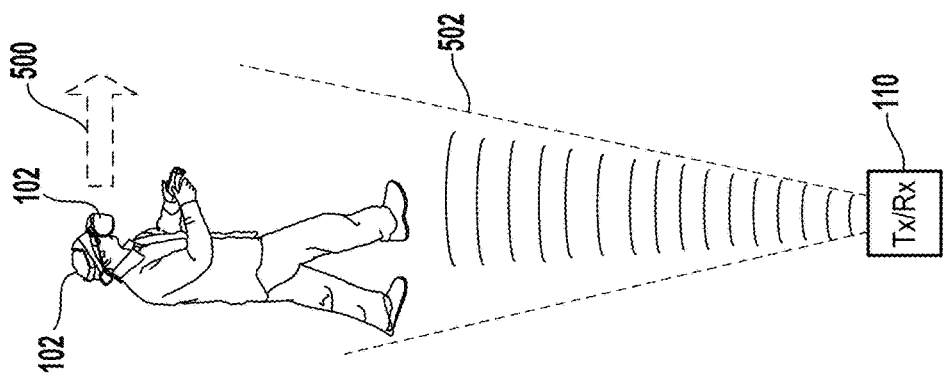
FIGS. 5A and 5B illustrate adjustment of the beamforming angular spread based on HMD movement, in accordance with implementations of the disclosure.
Figure 5B:
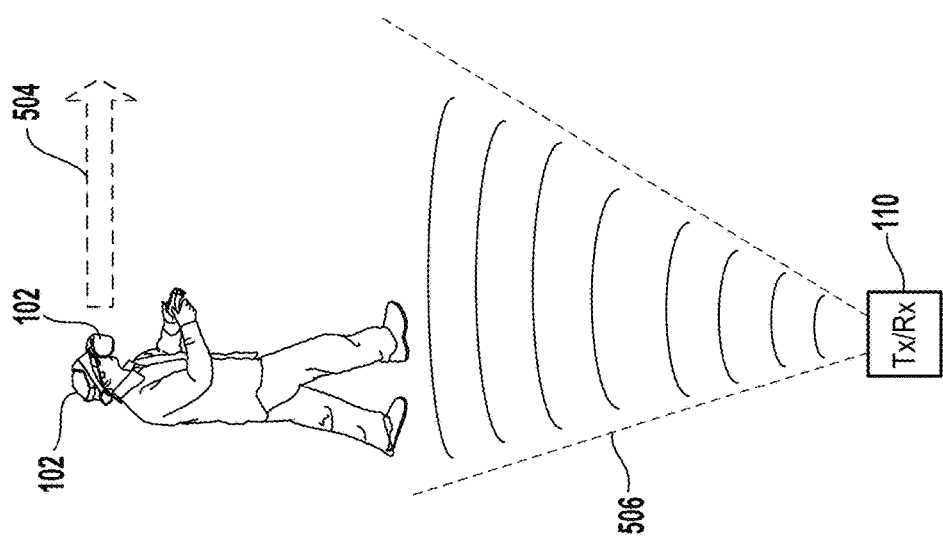

FIGS. 5A and 5B illustrate adjustment of the beamforming angular spread based on HMD movement, in accordance with implementations of the disclosure. It will be appreciated that in the present disclosure, the beamforming direction refers to the peak intensity direction of the main lobe of a beamforming transceiver 110. However, in addition to adjusting the beamforming direction, the beamforming angular spread, which is the angular width/spread of the main lobe, can also be adjusted. The angular spread of an electromagnetic beam can be defined using various definitions, such as the "full width at half maximum" (FWHM) (or "half power beam width" (HPBW) definition, which defines angular spread as the full width of the beam at half its maximum intensity.

In some implementations, the angular spread is adjusted based on the speed of the HMD 102. For example, at FIG. 5A, the HMD 102 operated by user 100 has a first speed indicated by the motion vector 500. Accordingly, the beamforming angular spread of the transceiver 110 is controlled to have an angular spread 502. At FIG. 5B, the HMD 102 operated by user 100 has a second speed indicated by the motion vector 504, which is faster than the first speed. Accordingly, the beamforming angular spread of the transceiver 110 is controlled to have an angular spread 506, which is wider/greater than the angular spread 502. The presently described implementation contemplates adjustment of the beamforming spread in manner that is positively correlated to the speed of the HMD, such that angular spread increases as HMD speed increases. This is useful for maintaining wireless connection stability, as the range of possible future locations of the HMD may tend to be greater when the HMD's speed is higher, and therefore a beamforming angular spread having greater angular width under such circumstances is more likely to maintain the HMD within the spread of the main lobe.

In a related implementation, the lateral speed of the HMD relative to the transceiver is prioritized versus the speed of the HMD in other directions, for purposes of determining the beamforming angular spread. It will be appreciated that when the HMD 102 is moving towards or away from the transceiver 110, the HMD may be less likely to move out of the main lobe of the transceiver, as opposed to when the HMD is moving in a lateral direction relative to the transceiver. Therefore, in some implementations, lateral movement of the HMD 102 relative to the transceiver 110 is considered, and the beamforming angular spread is adjusted in a positive correlation to the lateral speed.

In some implementations, the beamforming angular spread of the transceiver 110 is adjusted as a function of lateral speed of the HMD relative to the transceiver, to the exclusion of HMD speed in other non-lateral directions, such that the angular spread increases as lateral speed increases. In other implementations, the beamforming angular spread of the transceiver 110 is adjusted as a function of speed of the HMD, in a positive correlation such that angular spread increases as HMD speed increases, but with the lateral speed of the HMD being weighted more than HMD speed in other directions for purposes of determining the angular spread.

In some implementations, the distance of the HMD from the transceiver affects the beamforming angular spread. For example, when the HMD is closer to the transceiver, then movements of the HMD may be more likely to move the HMD out of the main lobe of the transceiver, versus when the HMD is further from the transceiver. Therefore, in some implementations, the beamforming angular spread is adjusted in inverse correlation to distance of the HMD from the transceiver, such that the angular spread increases as distance of the HMD from the transceiver decreases.

In related implementations, the concept can be applied based on detected movements of the HMD. For example, in some implementations, the beamforming angular spread is adjusted based on radial movement of the HMD towards/away from the transceiver, such that the angular spread is increased when radial movement of the HMD towards the transceiver is detected, and the angular spread is decreased when radial movement of the HMD away from the transceiver is detected. Furthermore, the amount of the increase or decrease in angular spread can be positively correlated to the speed of the HMD's radial movement towards or away from the transceiver, respectively.

Figure 5D:
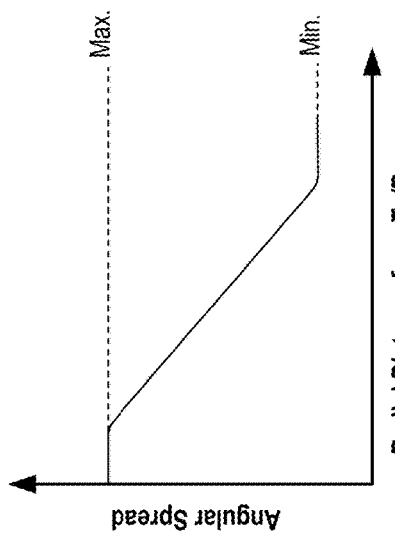
FIG. 5D is a graph illustrating beamforming angular spread of a transceiver versus radial distance of the HMD from the transceiver, in accordance with implementations of the disclosure.
Figure 5C:
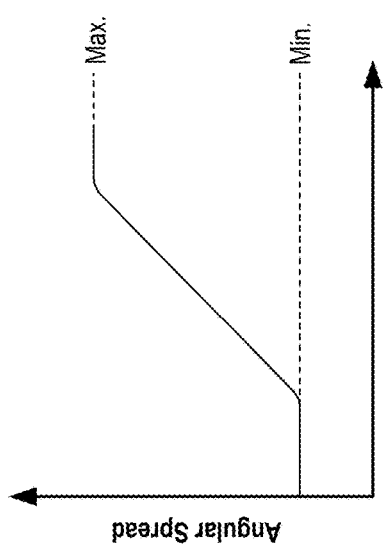
FIG. 5C is a graph illustrating beamforming angular spread of a transceiver versus speed of an HMD, in accordance with implementations of the disclosure.

FIG. 5C is a graph illustrating beamforming angular spread of a transceiver versus speed of an HMD, in accordance with implementations of the disclosure. Broadly speaking, the angular spread is positively correlated to the speed of the HMD, such that as HMD speed increases, so does the angular spread of the transceiver. However, below a certain minimum speed, the angular spread is maintained at a minimum value. And above a certain maximum speed, the angular spread is maintained at a maximum value. In some implementations, the speed of the HMD is specifically the lateral speed of the HMD relative to the transceiver. It will be appreciated that in accordance with the principles of the present disclosure, the speed of the HMD may be a predicted speed, e.g. based on factors such as a current speed and/or acceleration, and that the adjustment of the angular spread based on speed can thus be performed in a predictive manner.

FIG. 5D is a graph illustrating beamforming angular spread of a transceiver versus radial distance of the HMD from the transceiver. As shown, the angular spread generally inversely correlated to the radial distance of the HMD from the transceiver, with angular spread generally decreasing as the radial distance increases. However, below a certain minimum radial distance, the angular spread is maintained at a maximum value. And above a certain maximum radial distance the angular spread is maintained at a minimum value. It will be appreciated that in accordance with the principles of the present disclosure, the radial distance of the HMD from the transceiver may be a predicted radial distance, e.g. based on various factors such as current movement and acceleration, and that the adjustment of the angular spread based on radial distance can thus be performed in a predictive manner.

Figure 5E:
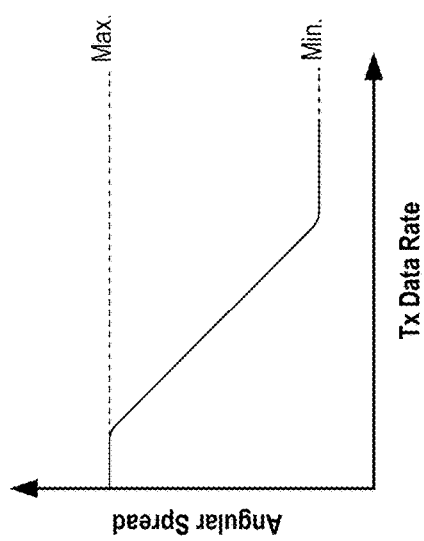
FIG. 5E is graph illustrating beamforming angular spread of a transceiver versus transmission data rate, in accordance with implementations of the disclosure.

In some implementations, the angular spread can be determined based on other factors, such as data rate. FIG. 5E is graph illustrating beamforming angular spread of a transceiver versus transmission data rate, in accordance with implementations of the disclosure. Broadly speaking, the angular spread is inversely correlated to the transmission data rate, so that angular spread decreases as the data rate increases. A narrower angular spread can provide higher bandwidth, albeit over a narrower width. Thus, by changing the angular spread as a function of data rate in this manner, there is a tradeoff between the available bandwidth when the signal is properly directed towards the HMD, and the wireless connection's tolerance to movement of the HMD. In some implementations, below a certain minimum data rate, the angular spread is maintained at a maximum value. And above a certain maximum data rate, the angular spread is maintained at a minimum value.

The above-described implementations which relate to adjustment of the beamforming angular spread are provided by way of example, without limitation. Further implementations falling within the scope of the present disclosure are encompassed by the combination of any of the foregoing implementations which are not exclusive of each other.

Figure 6C:
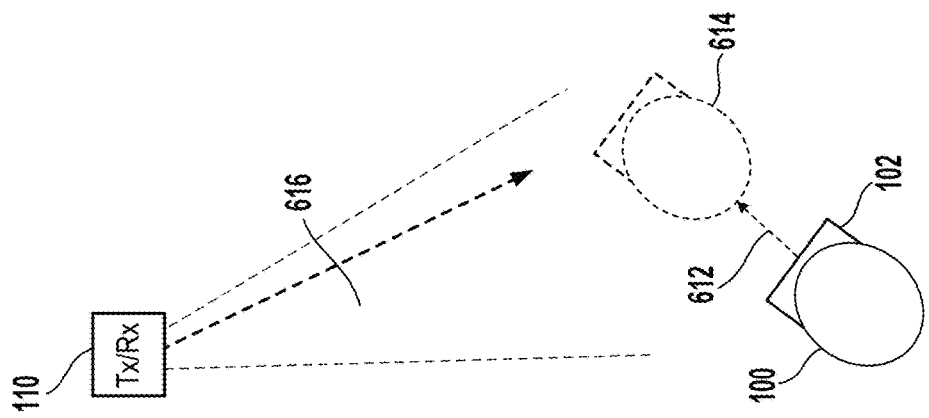
FIGS. 6A, 6B, and 6C illustrate a scenario wherein the beamforming direction is adjusted based on the gaze direction of the user 100, in accordance with implementations of the disclosure.
Figure 6B:
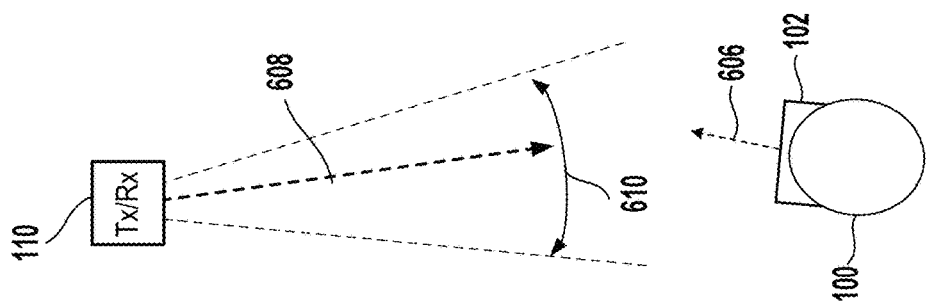
Figure 6A:
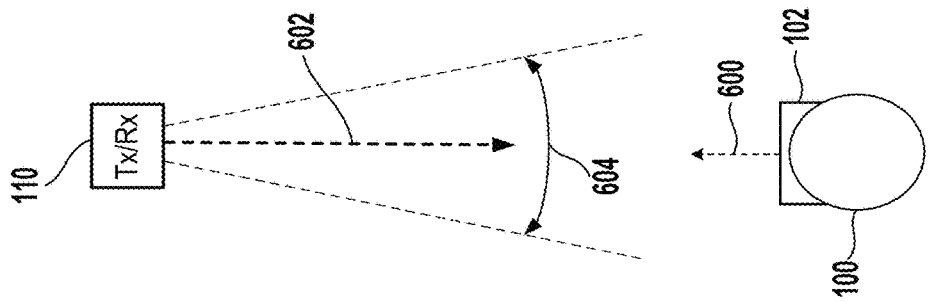

In some implementations, the beamforming direction and/or angular spread can be adjusted based on the gaze direction of the user. FIGS. 6A, 6B, and 6C illustrate a scenario wherein the beamforming direction is adjusted based on the gaze direction of the user 100, in accordance with implementations of the disclosure. FIG. 6A shows an overhead view of the user 100 wearing the HMD 102. The user 100 is shown having a gaze direction 600. The transceiver 110 is configured to have a beamforming direction 602 that is directed towards the HMD 102. It will be appreciated that the angular spread of the transceiver is approximately centered about the HMD 102.

At FIG. 6B, the user 100 has moved his gaze direction to the right to a gaze direction 606. A change in the gaze direction of the user 100 may be indicative that the user is about to move, for example, approximately in the direction of the new gaze direction. Therefore, in accordance with some implementations, the beamforming direction of the transceiver 110 is adjusted in response to changes in the user's gaze direction. With continued reference to FIG. 6B, as the gaze direction 606 has moved to the right of the user 100, so the beamforming direction 608 is moved in a similar direction, being responsively changed to an updated beamforming direction 608. Though the beamforming direction 608 is changed, its angular spread 610 is such that the HMD 102 is still located within the main lobe, so as to maintain the wireless connection with the HMD, as the HMD has not actually moved to a new location yet. It will be appreciated that the beamforming direction has been predictively moved based on changes in the user's gaze direction. While the HMD's location has not changed, the beamforming direction may be predictively adjusted, but within a range that maintains the HMD 102 within the angular spread of the transceiver 110.

At FIG. 6C, the user 100 has further moved his gaze direction to a gaze direction 612, by for example, additionally rotating his head. The user then moves to a new location indicated by ref. 614. As the user 100 moves, the beamforming direction of the transceiver is predictively moved to the direction 616, so as to maintain a strong wireless connection.

In some implementations, the gaze direction of the user (and/or changes thereof) is another factor that can be considered for purposes of predicting a future location of the HMD. The gaze direction can be weighted in combination with the additionally described factors for determining a predicted future location, and the beamforming direction can be adjusted accordingly. Furthermore, in additional implementations, the gaze direction of the user can be applied to affect the beamforming angular spread.

In some implementations, the location of the HMD can be tracked over time, and a distribution of the locations of the HMD within an interactive environment can be determined. Future locations of the HMD can be determined, at least in part, based on the historical location distribution of the HMD.

Figure 7:
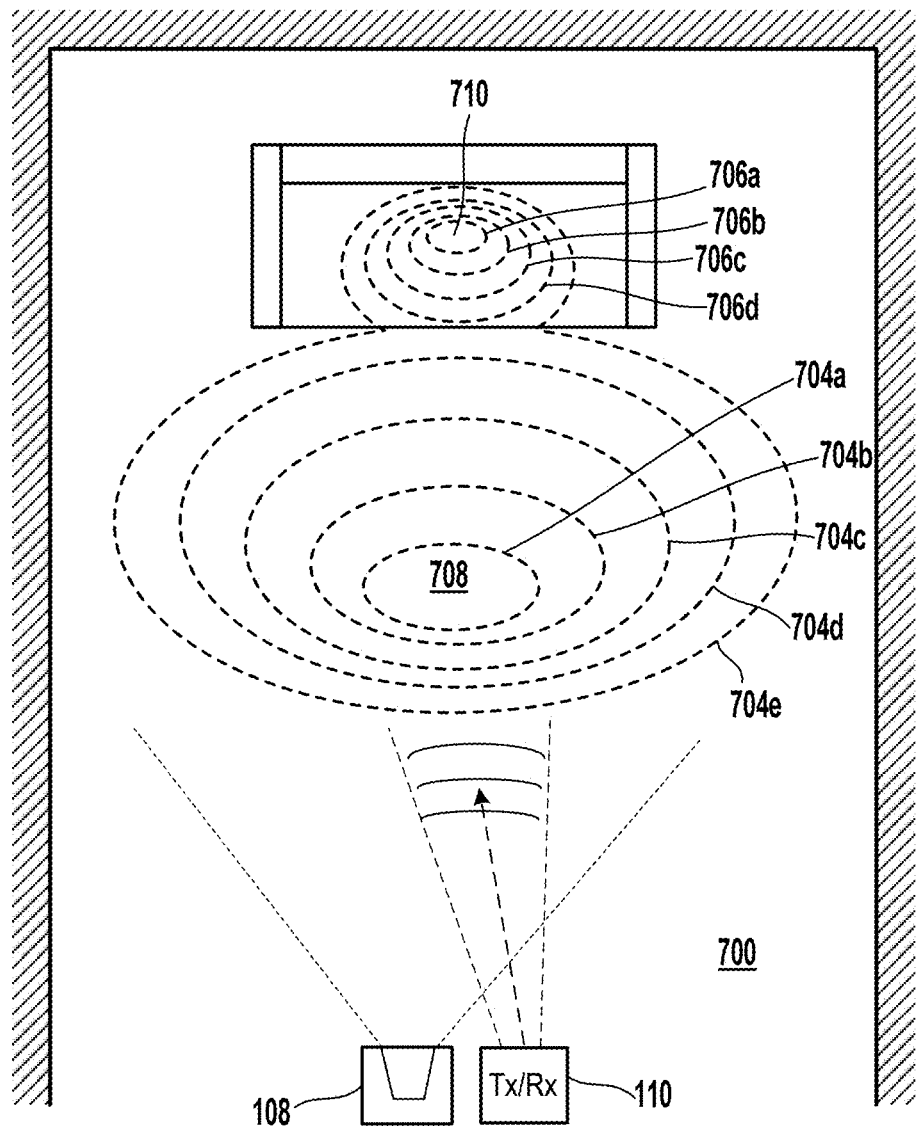
FIG. 7 illustrates an overhead view of a room 700 showing location distribution of an HMD, in accordance with implementations of the disclosure.

FIG. 7 illustrates an overhead view of a room 700 showing location distribution of an HMD, in accordance with implementations of the disclosure. The room 700 defines an interactive real environment in which the HMD is operated by the user, and in which the camera 108 and the transceiver 110 are disposed. The lines 704a-e and 706a-d are isometric location distribution lines based on historical locations of the HMD in the room 700. That is, the locations of the HMD during interactivity have been tracked over time, e.g. by recording the location of the HMD at periodic intervals, and the distribution of the locations in the room 700 are such that the density (number of occurrences per unit area) or frequency or probability of occurrence is the same or approximately the same along a given one of the lines 704a-e or 706a-d. In the illustrated implementation, the highest isometric value illustrated is that of the lines 704a and 706a, with diminishing values for the lines 704b, c, and d, as well as for lines 706b, c, and d. In the illustrated implementation, the line 704e represents the lowest isometric value that is illustrated.

It will be appreciated that the regions 708 and 710 exhibit the highest distribution density of locations for the HMD. In other words, the HMD has a statistically higher probability of being located in a unit area of the regions 708 and 710 versus other being located in a unit area of other regions of the room 700. In the illustrated implementation, a couch/chair 702 is shown in the room 700. The region 710 and surrounding regions correspond to a centrally seated location on the couch 702, as the user may spend significant amounts of time using the HMD while seated on the couch 702. The region 708 and surrounding regions are front of the couch, and thus may indicate regions where the user is standing in front of the couch while using the HMD.

In some implementations, the location distribution is utilized as a factor for determining the predicted future location of the HMD. For example, a probability or weight can be determined as a function of location that is indicative of the likelihood of the HMD being located at that location, and this can be used as a factor for determining the predicted future location of the HMD.

In a related implementation, for a given interactive application, HMD location/movement patterns across a plurality of users can be determined, for example by recording location/movement information for a plurality of HMD's and uploading such information to a server for processing and analysis. The location/movement information is correlated to the state of the interactive application, and thus HMD location/movement patterns for a given state of the interactive application (e.g. at a particular temporal or geographical location within a virtual environment defined by the interactive application) can be determined. This can provide crowd-sourced data regarding HMD location and movement for specific application states, which can be utilized to predict future locations and movements of a particular user's HMD during interaction with the interactive application.

Figure 8:
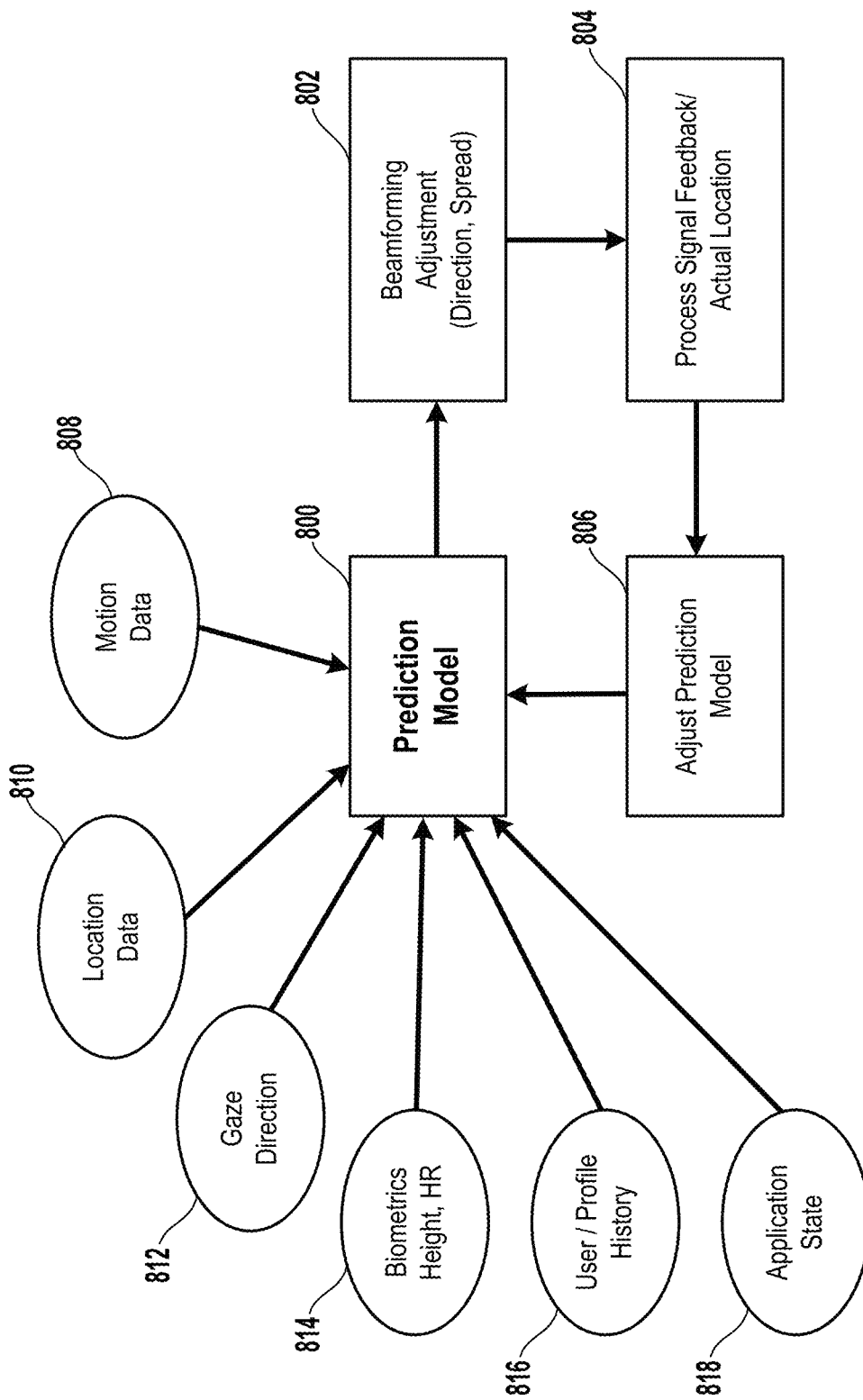
FIG. 8 conceptually illustrates the use of a prediction model to determine beamforming parameters, in accordance with implementations of the disclosure.

FIG. 8 conceptually illustrates the use of a prediction model to determine beamforming parameters, in accordance with implementations of the disclosure. The prediction model 800 is configured to predict a future location and/or movement (e.g. velocity, acceleration) of the HMD using one or more inputs.

By way of example, such inputs can include any of the following: motion data 808 (e.g. velocity (direction and speed), acceleration, rotation, etc.), location data 810 (e.g. 3D coordinates, relative location information, historical location information, etc.), gaze direction 812, user biometrics 814 (e.g. height, weight, heart rate, respiration, pupil dilation, etc.), user profile/history (e.g. user preferences, user movement/gesture patterns, etc.), and application state 818 (e.g. application variable states, virtual object states, etc.).

Based on the output of the prediction model, beamforming parameters of the transceiver are adjusted (ref. 802), which can include adjustment of the direction and/or angular spread of the main lobe. It will be appreciated that the beamforming of the transceiver is predictively adjusted so that the beamforming adjustments can occur simultaneous with or even prior to the actual movements of the HMD, so as to ensure that the HMD remains within the beamforming main lobe and is provided with a consistently strong wireless connection.

At operation 804, feedback data can be processed to evaluate the effectiveness of the beamforming adjustments and/or the prediction model's accuracy. In some implementations, the feedback data includes signal quality measurements taken by the HMD indicating the quality of the wireless signal received by the HMD from the transceiver. By way of example, such signal quality measurements can include signal strength, signal-to-noise ratio, bandwidth, errors, or other measures of the quality of the wireless signal transmitted by the transceiver and received by the HMD. By evaluating the signal quality of the transceiver, the effectiveness of the beamforming adjustments and/or the accuracy of the prediction model can be evaluated.

In some implementations, the feedback data includes location and/or movement data indicating the actual locations and/or movements of the HMD, which can be compared to predicted locations/movements generated by the prediction model, to evaluate the accuracy of the prediction model.

Based on the above, then at operation 806, the prediction model 800 can be adjusted to improve its accuracy. In some implementations, machine learning techniques can be applied to improve the prediction model.

Figure 9:
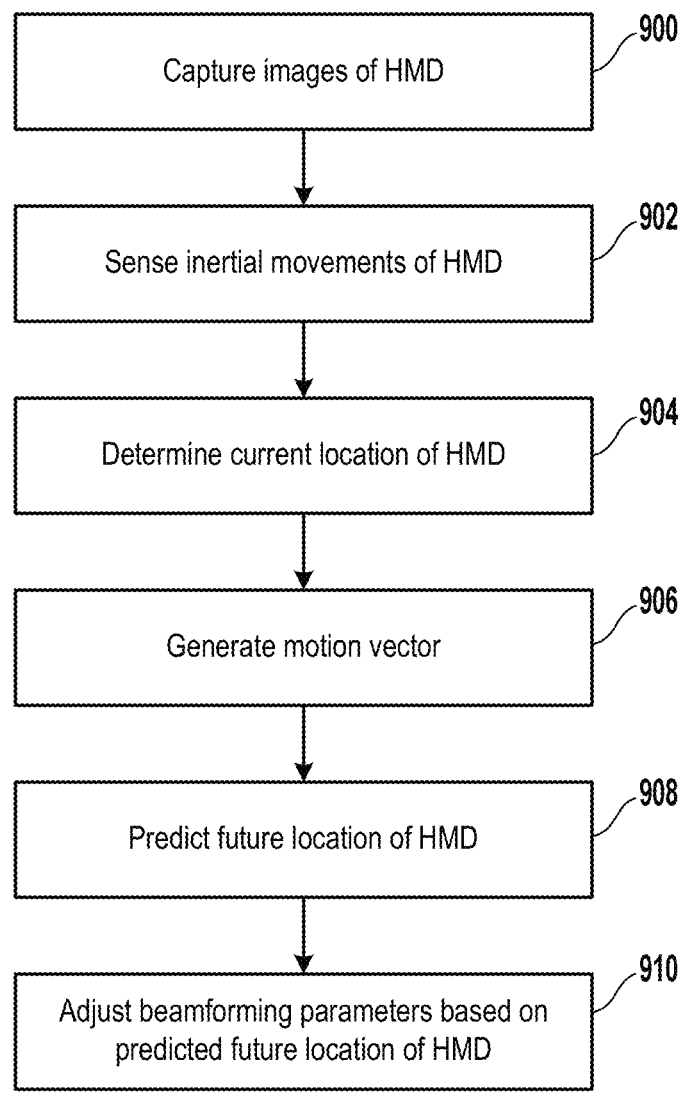
FIG. 9 illustrates a method for adjusting beamforming parameters using a predicted future location, in accordance with implementations of the disclosure.

FIG. 9 illustrates a method for adjusting beamforming parameters using a predicted future location, in accordance with implementations of the disclosure. At method operation 900, images of a real-world interactive environment including the HMD are captured by a camera. At method operation 902, inertial movements of the HMD are sensed by one or more inertial sensors of the HMD. At method operation 904, the current location of the HMD is determined based at least in part on one or both of the sensed inertial movements of the HMD and the captured images of the HMD.

At method operation 906, a motion vector is generated based at least in part on one or both of the sensed inertial movements of the HMD and the captured images of the HMD. At method operation 908, a future location of the HMD is predicted using the motion vector and the current location of the HMD. At method operation 910, one or more beamforming parameters of the transceiver, such as direction and/or angular spread, are adjusted based on the predicted future location of the HMD.

Though in the present disclosure, implementations have generally been described with reference to predicting a future location of the HMD and steering an RF beamforming direction towards the predicted future location, it should be appreciated that in some implementations, a specific future location is not necessarily determined. But rather, the adjustment of the beamforming direction in a predictive manner is achieved based on the various input parameters without specifically determining or identifying a particular future location. It will be appreciated that the beamforming direction in such implementations will be predictively steered in a manner based on the inputs that would be towards a predicted future location if such was determined.

Figure 10:
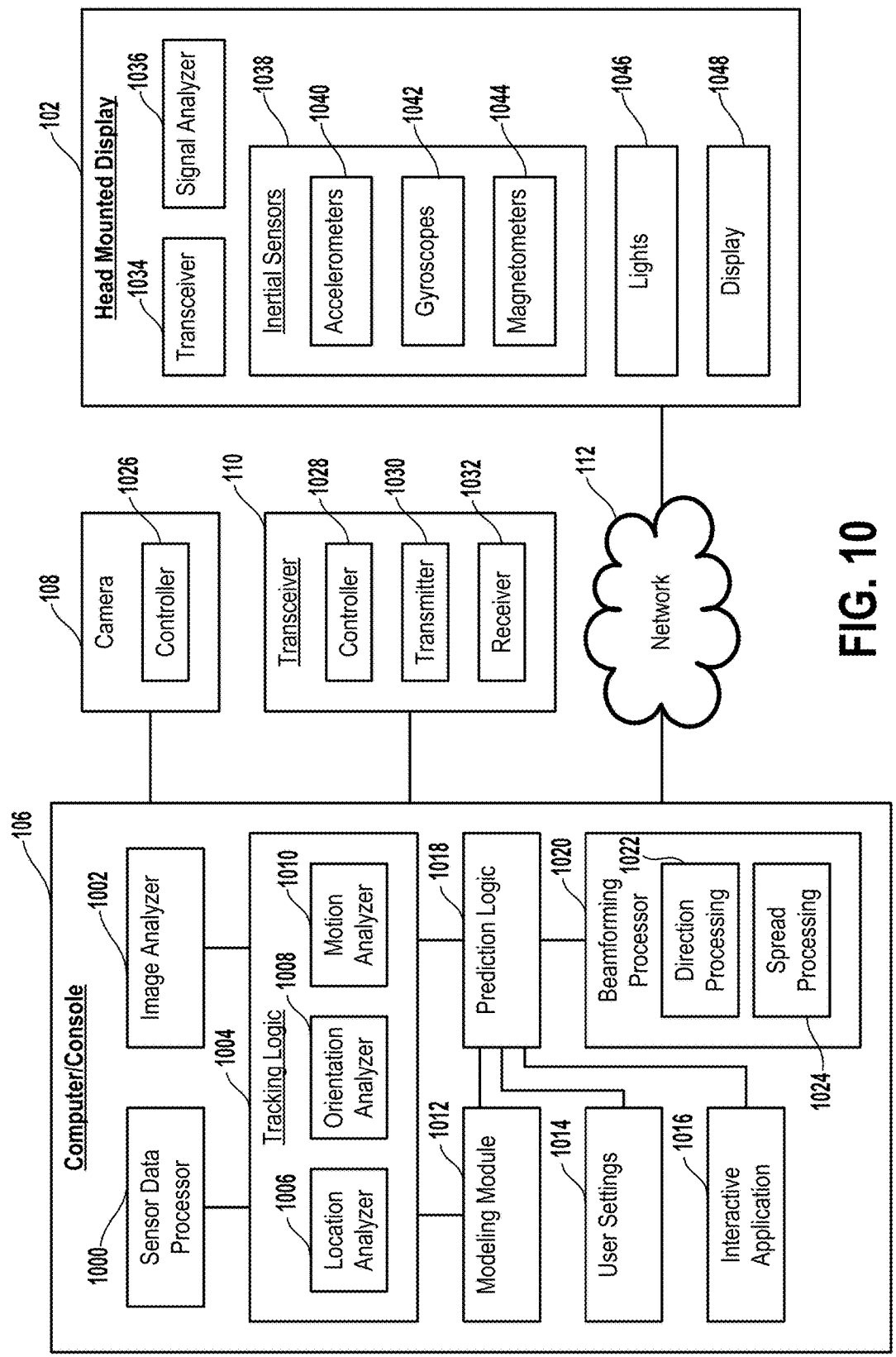
FIG. 10 conceptually illustrates a system for providing wireless communication between a computer and a HMD, in accordance with implementations of the disclosure.

FIG. 10 conceptually illustrates a system for providing wireless communication between a computer and a HMD, in accordance with implementations of the disclosure. The computer 106 is connected to a camera 108 and a transceiver 110. As noted, the camera 108 and the transceiver 110 may be part of the same device in some implementations, or separate devices in other implementations. The camera 108 includes a controller 1026 that is configured to process instructions received from the computer 106 to control the camera's operating parameters, e.g. aperture, sensor gain, etc. The transceiver 110 includes a controller 1028 that is configured to process instructions from the computer 106 to control the operation of the transceiver 110 including control of the transceiver's transmitter 1030 and receiver 1032. It will be appreciated that the transmitter 1030 and receiver 1032 can be configured to effect beamforming in accordance with the principles of the present disclosure.

Broadly speaking the computer 106 executes an interactive application 1016 (e.g. a video game) to generate video data (including image and audio data) that is wirelessly transmitted to the HMD 102 for rendering to the display 1048 of the HMD 102. The beamforming direction and/or spread of the transceiver 110 are adjusted so as to maintain wireless coverage and directionality towards the HMD. The HMD includes various inertial sensors 1038, for example including one or more accelerometers 1040, gyroscopes 1042, and magnetometers 1044. Data processed from the inertial sensors 1038 is communicated by the HMD to the computer 106, via transmission from the HMD's transceiver 1034 to the transceiver 110. The computer 106 includes sensor data processor 1000 that is configured to process the inertial sensor data from the HMD, e.g. to determine or identify movements of the HMD.

The camera 108 is configured to capture images of the interactive real environment in which the user operates the HMD. The captured images by the camera 108 are processed by the image analyzer 1002, e.g. to identify the HMD, such as by identifying lights 1046 of the HMD 102.

Tracking logic 1004 is configured to further analyze, and identify and/or quantify the location, orientation, and/or movement of the HMD. To this end a location analyzer 1006 is configured to determine the location of the HMD based on the inertial sensor data and the captured image data. An orientation analyzer is configured to determine the orientation of the HMD based on the inertial sensor data and the captured image data. A motion analyzer is configured to determine the motion of the HMD based on the inertial sensor data and the captured image data.

Prediction logic 1018 uses a model to predict a future location and/or movement of the HMD 102 based on various inputs such as the aforementioned location, orientation and movement of the HMD 102. In some implementations, the prediction logic 1018 uses additional inputs such as user settings 1014 or information from the interactive application 1016. For example, the interactive application 1016 may provide information regarding future expected locations or movements of the HMD, based on the current state of the interactive application. A beamforming processor 1020 is configured to determine beamforming parameters and adjustments thereto, based on the predicted future locations and/or movements of the HMD. A direction processing module 1022 is configured to determine the beamforming direction, and adjustments thereto, of the transceiver 110. A spread processing module 1024 is configured to determine the angular spread, and adjustments thereto, of the transceiver 110. The updated beamforming parameters are communicated to the controller 1028 of the transceiver 110, which effects adjustment of the parameters of the transceiver, such as steering/updating the beamforming direction to an updated direction, and/or updating the angular spread.

In some implementations, the HMD 102 includes a signal analyzer 1036 that is configured to evaluate the quality of the signal received from the transceiver 110. For example, signal analyzer 1036 may analyze the wireless signal from the transceiver 110 to determine its signal strength. This information can be provided back to the computer 106 as feedback, to enable evaluation of whether a strong signal is being maintained and the predictive adjustment of beamforming direction and angular spread is effective. In some implementations, the feedback data is provided via a separate communication channel and/or a separate communication protocol/context than that utilized for the transmission of the video data to the HMD 102. For example, in some implementations, the feedback data is transmitted over the network 112 from the HMD to the computer 106 (rather than being transmitted via the transceiver 110). By way of example, the network 112 may include a wireless router or other wireless networking device through which the HMD 102 wirelessly accesses the network 112. The computer 106 may also access the network 106 through either a wired or wireless connection.

The use of an alternate communications protocol/context for purposes of providing the feedback data is beneficial in case wireless connection via the transceiver 110 is lost, in which case an alternate path for communication back to the computer 106 is possible. It will be appreciated that the bandwidth requirement for the transmission of feedback data, and other types of data, can be significantly less than that required for transmission of video data. Thus, transmission of the feedback data over a communications context with less bandwidth (e.g. than that used to transmit video data to the HMD), for example a conventional WiFi network connection, can be sufficient for such purposes.

In some implementations, the transmission of feedback data occurs over a separate frequency band than that used for the wireless transmission of video data to the HMD. For example, the video data may be transmitted to the HMD over a 60 GHz frequency band, whereas the feedback data is transmitted over different frequency band, e.g. a 2.4 GHz or 5 GHz band. It will be appreciated that in such implementations, the transmitter 1030 of the transceiver 110 and the corresponding receiver of the HMD's transceiver 1034 are configured to operate at 60 GHz, whereas the receiver 1032 of the transceiver 110 and the corresponding transmitter of the HMD's transceiver 1034 are configured to operate at a different frequency band.

As has been noted, in some implementations beamforming is applied by the transceiver 110 for both transmission and reception purposes. However, in some implementations, beamforming can be applied selectively by the transceiver 110 for transmission only, while no beamforming is applied for reception. In this manner, communication from the HMD back to the transceiver is more likely to be maintained even if transmission to the HMD is compromised or lost (e.g. due to failure of the main lobe to adequately track the HMD). In other implementations, beamforming can be applied in different ways for transmission versus reception. For example, the angular spread of the beamforming for reception by the transceiver 110 may be configured to be greater than the angular spread of the beamforming for transmission by the transceiver 110. This can afford greater signal stability for receiving communication from the HMD (versus transmission to the HMD) while still providing some benefit in terms of reception directionality.

In still further implementations, the quality of signal reception by the transceiver 110 can serve as additional feedback data that is indicative of whether the beamforming direction of the transceiver is being effectively steered towards the HMD.

Implementations of the disclosure employ beamforming as a signal processing technique to achieve directional signal transmission and/or reception. Beamforming technology entails operation of a phased array of transmission or reception elements to purposely produce constructive interference in a desired direction and over a desired angular width. Beamforming can be used to achieve spatial selectivity for both transmission and reception. Broadly speaking, transmission beamforming entails control of the phase and relative amplitude of the signal at each of a plurality of spatially separated antennas, whereas reception beamforming entails combining signals received from such antennas that have been phase and amplitude adjusted. A basic discussion of beamforming can found with reference to "A Primer on Digital Beamforming," Toby Haynes, Spectrum Signal Processing, Mar. 26, 1998 (http://www.spectrumsignal.com/publications/beamform_primer.pdf), the disclosure of which is incorporated by reference.

Though implementations have generally been described with reference to use of inertial data and captured image data for purposes of determining location and movement of the HMD, it should be appreciated that the principles of the present disclosure can be applied with any known method for determining location/orientation and/or movement of an HMD. For example, in some implementations, the HMD includes one or more outward facing cameras which can be utilized for movement and position tracking, e.g. using simultaneous localization and mapping (SLAM) techniques as are known in the art. In some implementations, recognizable objects (e.g. emitters (e.g. RF, IR, visible spectrum, laser, ultrasonic, magnetic, etc.), lights, reflective objects, tags, shaped objects, patterns, etc.) can be positioned in the local environment to assist in such tracking. Such objects can be detected by appropriate sensors mounted on the HMD (e.g. camera, photo sensing diode, magnetic sensor, microphone, etc.). It will be appreciated that such sensors can include one or more sensors distributed about the HMD, or an array of sensors in a predefined configuration that can be operated in concert to enable localization and tracking of the HMD. Any known method for localization and tracking of the HMD can be applied to enable predictive RF beamforming in accordance with the principles of the present disclosure, to enable a fully wirelessly operated HMD. All such implementations are not described in detail herein, but will be readily apparent to those skilled in the art and understood as part of the present disclosure.

Figure 11A:
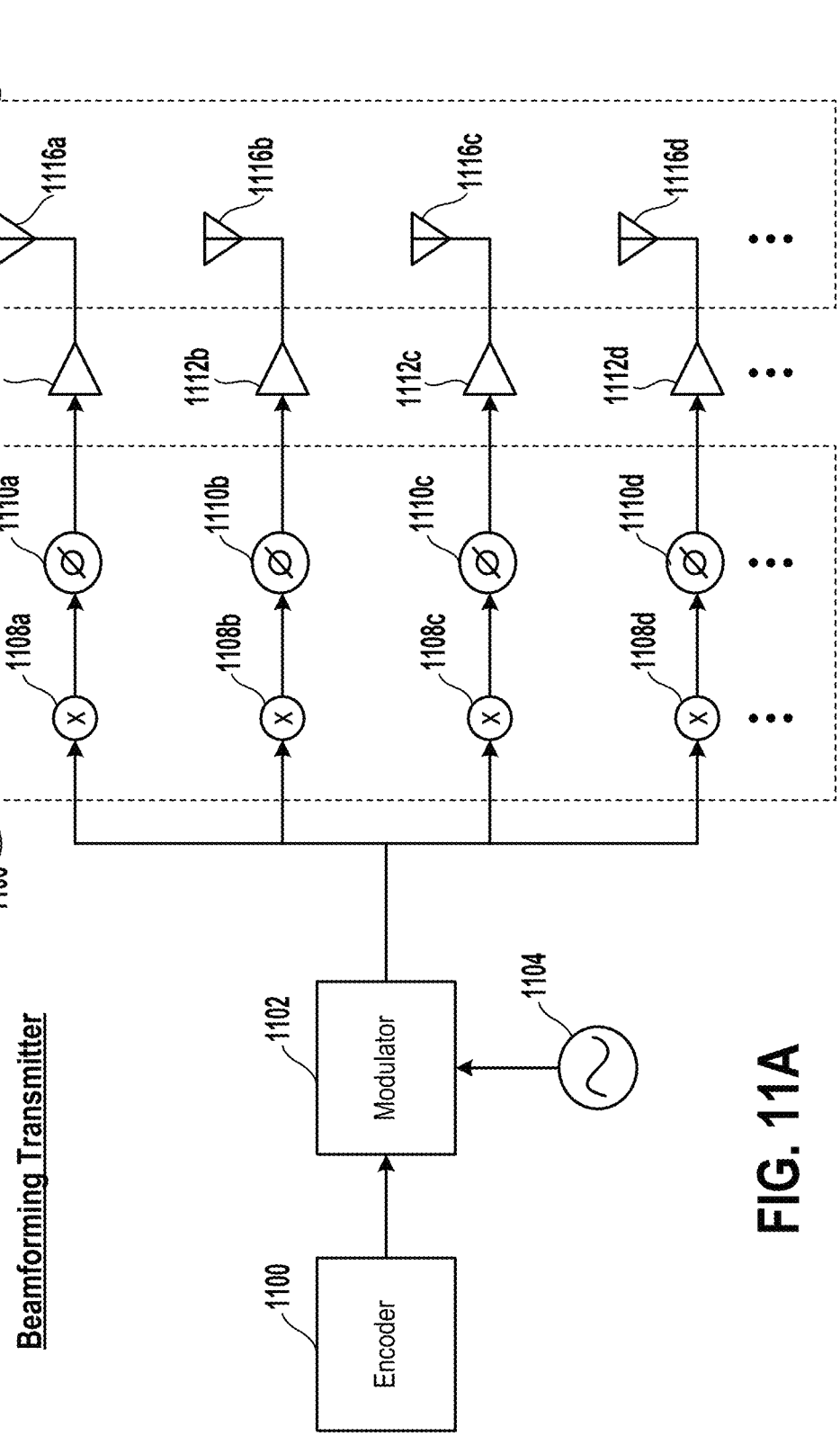
FIG. 11A is a schematic diagram showing components of a beamforming transmitter, in accordance with implementations of the disclosure.

FIG. 11A is a schematic diagram showing components of a beamforming transmitter, such as the transmitter 1030 of the transceiver 110, in accordance with implementations of the disclosure. An encoder 1100 is configured to receive and encode information for wireless transmission (e.g. video data for transmission to the HMD). The encoder 1100 may format or otherwise process the information for transmission, e.g. performing block encoding, compression, adding redundancy for error reduction, etc. A modulator 1102 transforms the encoded data into a waveform, for example by mapping binary digits to a carrier frequency (e.g. pulse amplitude modulation (PAM), phase-shift keying (PSK), etc.). In some implementations, a carrier frequency is generated by a carrier oscillator 1104. Though not specifically shown, in some implementations, the waveform generated by the modulator can be frequency upconverted and/or amplified.

The waveform is provided to a beamformer 1106, which feeds the waveform in parallel to a plurality of amplitude adjusters 1108a-d, and to a plurality of phase shifters 1110a-d. The amplitude adjusters and phase shifters enable individual adjustment/tuning of the amplitude and phase of the waveform for each antenna 1116a-d of an antenna array 1114. Corresponding amplifiers 1112a-d are provided to amplify the adjusted waveform for transmission via the antennas 1116a-d. The antennas 1116a-d of the antenna array 1114 are spatially arranged in a predefined configuration. As noted, the transmission of the phase and amplitude adjusted signals from the antennas of the antenna array produces a wavefront having a pattern of constructive and destructive interference that produces the desired beamforming effect.

Figure 11B:
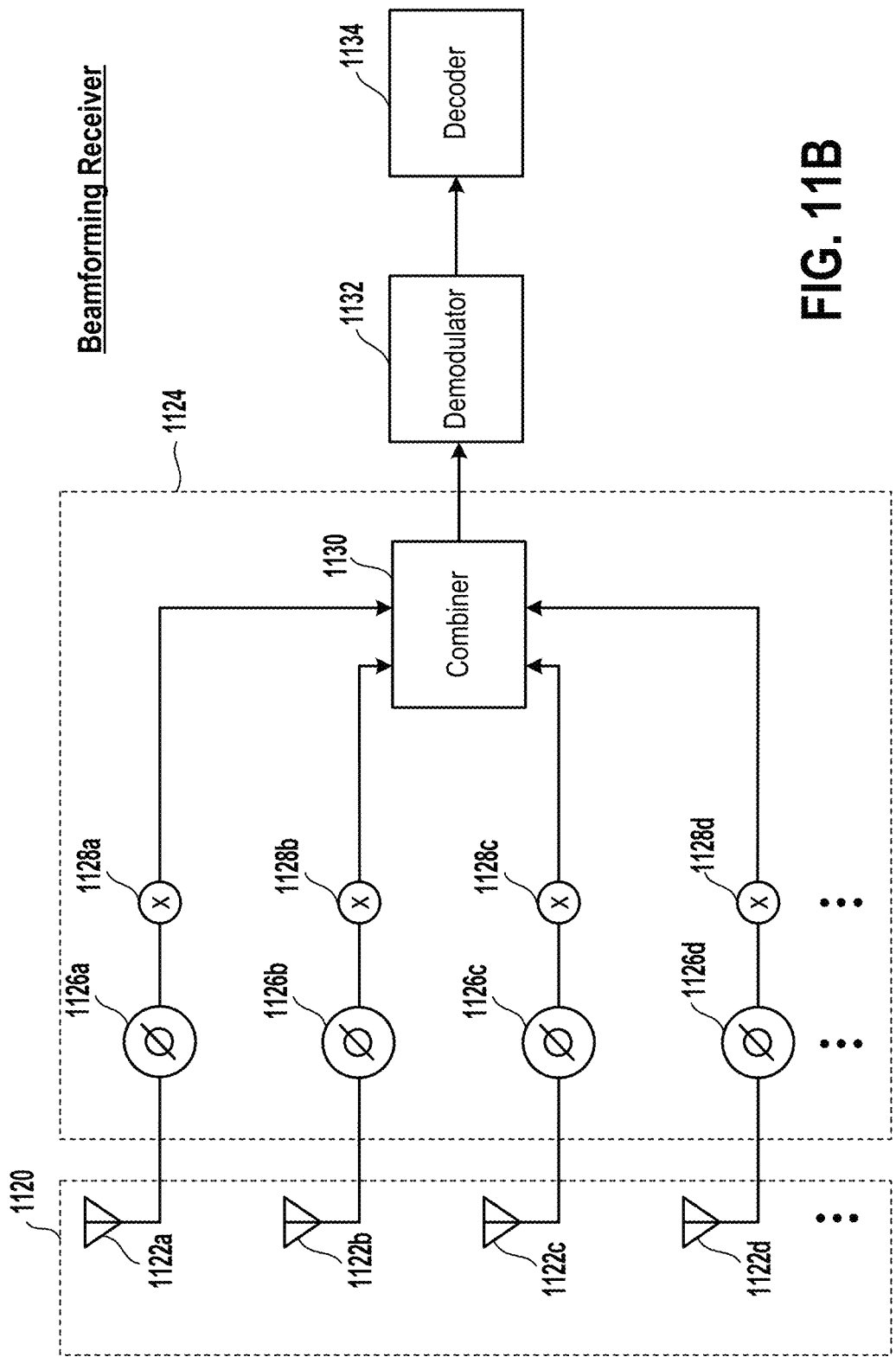
FIG. 11B is a schematic diagram showing components of a beamforming receiver, in accordance with implementations of the disclosure.

FIG. 11B is a schematic diagram showing components of a beamforming receiver, such as the receiver 1032 of the transceiver 110, in accordance with implementations of the disclosure. An antenna array 1120 includes a plurality of antennas 1122a-d. The signals received by the antenna array 1120 are fed to a beamformer 1124, which individually adjusts, for each antenna, the phase and amplitude of the received signal via a plurality of phase adjusters 1126a and amplitude adjusters 1128a. The adjusted signals are then combined via a combiner 1130, which may also amplify the combined signal. Though not specifically shown, in some implementations, the combined signal can be frequency downconverted and/or separately amplified.

A demodulator 1132 demodulates the combined signal to extract the encoded data, and a decoder 1134 decodes the encoded data to extract the original information.

In some implementations, the antenna array 1114 (transmitter antenna array) and the antenna array 1120 (receiver antenna array) are separate devices. However, in other implementations, the antenna arrays 1114 and 1120 are the same device, with, for example, a diplexer configured to divert transmission and reception signals appropriately. In various implementations, the antenna arrays may be microstrip/patch antenna arrays or other types of antenna arrays having a plurality of antennas positioned in a predefined configuration to enable beamforming in accordance with the principles of the present disclosure. Patch antennas as are known in the art may have tens to hundreds of individual antenna elements.

In some implementations, wireless communication in accordance with the principles of the present disclosure (e.g. for transmission of video data to an HMD) occurs over a 60 GHz frequency band. In some implementations, wireless communication takes place over other frequency bands, and may further utilize a combination of different frequency bands.

Figure 12A:
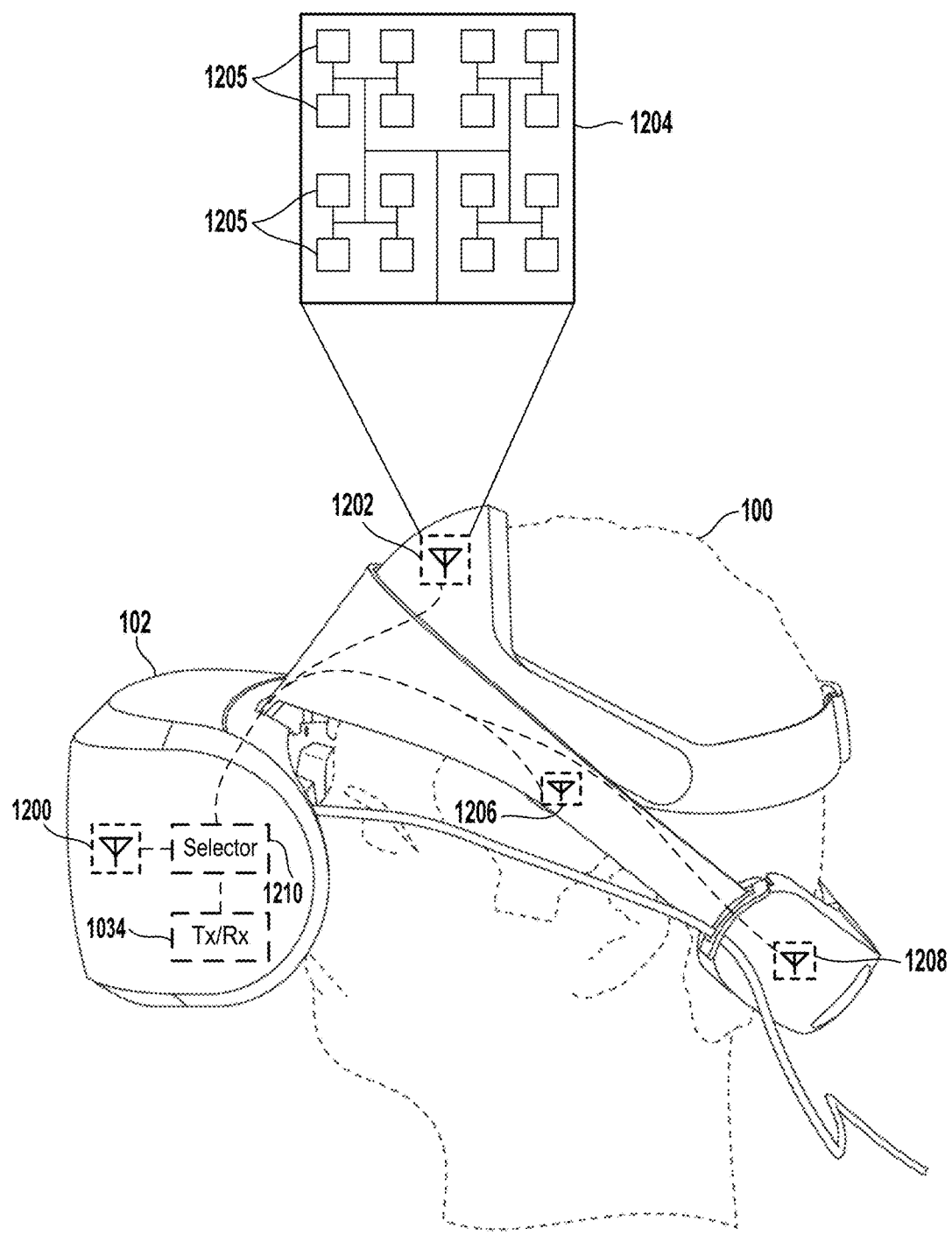
FIG. 12A conceptually illustrates a HMD having a plurality of antenna arrays, in accordance with implementations of the disclosure.

FIG. 12A conceptually illustrates a HMD having a plurality of antenna arrays, in accordance with implementations of the disclosure. As shown, the HMD includes an antenna array 1200 positioned at the front of the HMD 102, an antenna array 1202 positioned at the top of the HMD 102, an antenna array 1206 positioned at a side of the HMD 102, and an antenna array 1208 positioned at the rear of the HMD 102. The antenna arrays are connected to a selector 1210 that governs which of the antenna arrays is active for purposes of signal reception and/or signal transmission by the transceiver 1034. As the user 100 moves in the interactive real environment, the HMD's location and orientation may change, thereby changing which of the antenna arrays is optimally positioned. In some implementations, the optimally positioned antenna array may be the antenna array that is nearest to the transceiver or which offers the best line-of-sight to the transceiver. Accordingly, the selector 1210 can be configured to switch between the various antenna arrays, selecting the one that is most optimally positioned. In some implementations, the selector 1210 is configured to continuously measure the reception signal strength from each of the antenna arrays 1200, 1202, 106, and 1208, and determine which provides the highest signal strength, and if necessary, then switch from using a current one of the antenna arrays to using the antenna array that provides the highest signal strength.

Shown at ref. 1204 is an expanded representation of one antenna array. Each antenna array can include multiple individual antenna elements 1205.

Figure 12D:
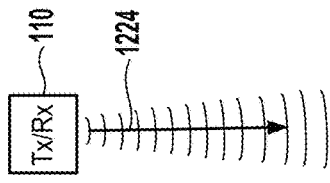
FIGS. 12B, 12C, and 12D illustrate overhead views of an HMD in an interactive real environment, illustrating switching of active antenna arrays on an HMD, in accordance with implementations of the disclosure.
Figure 12D:
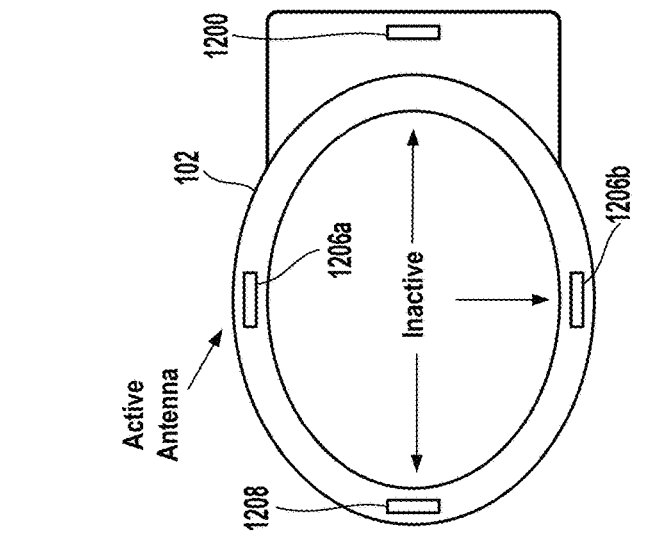
Figure 12C:
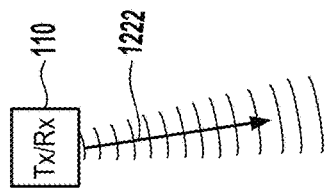
Figure 12C:
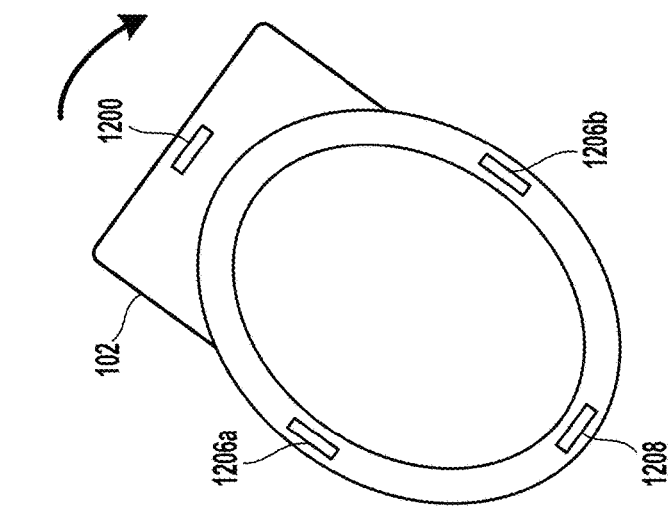
Figure 12B:
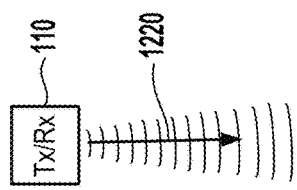
Figure 12B:
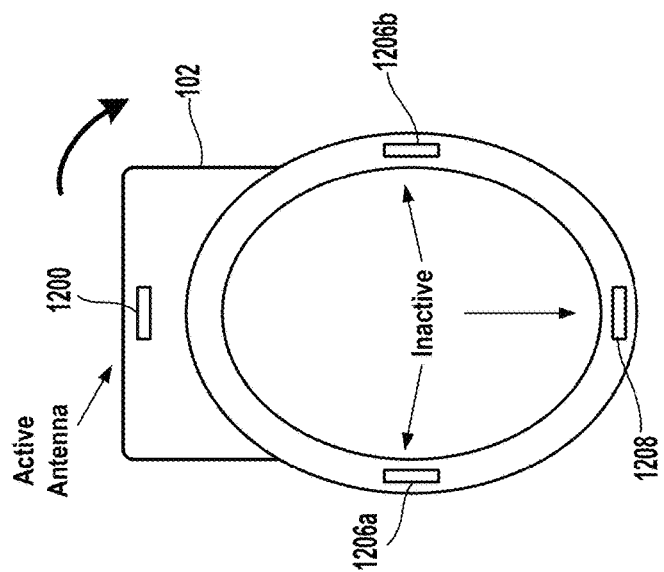

FIGS. 12B, 12C, and 12D illustrate overhead views of an HMD in an interactive real environment, illustrating switching of active antenna arrays on an HMD, in accordance with implementations of the disclosure. At FIG. 12B, the front of HMD 102 is facing towards the transceiver 110. In accordance with implementations of the disclosure, the transceiver 110 has a beamforming direction 1220 that is directed towards the antenna array 1200, which is the currently active antenna array of the HMD, from which received signals are processed to extract/decode video data for rendering on the HMD. The additional antenna arrays 1206a, 1206b, and 1208 are currently in an inactive state, meaning that signals received from these antenna arrays are not specifically processed for video rendering as is the case for the antenna array 1200. However, the signals of the antenna arrays 1206a/b and 1208 may still be monitored to, for example, determine their signal strength to determine which of the antenna arrays is optimally positioned at a given moment.

At FIG. 12C the HMD has rotated in a clockwise direction, thus moving the antenna array 1200. The transceiver is accordingly adjusted to have a beamforming direction 1222 that is towards the antenna array 1200, and may have been predictively steered in accordance with the principles discussed herein. The antenna array 1200 remains as the active antenna array, while the others are inactive.

However, at FIG. 12D, the HMD 102 has rotated to a point wherein the antenna array 1206a is now the nearest, and provides the most unobstructed line-of-sight, to the transceiver 110. Therefore, the active antenna array is switched from the antenna array 1200 to the antenna array 1206a. Additionally, the beamforming direction of the transceiver is redirected towards the newly active antenna array 1206*a* instead of the array 1200.

It will be appreciated that in some implementations, the orientation of the HMD in the interactive environment (e.g. relative to the transceiver) can be determined using the inertial data and captured image data as previously described. The orientation of the HMD can then be utilized to determine which of the antenna arrays is most optimal for signal reception by the HMD. Additionally, the presently described antenna switching scheme can be performed in a predictive manner, such that antenna arrays are activated or deactivated based on predicted future orientations of the HMD.

Figure 13:
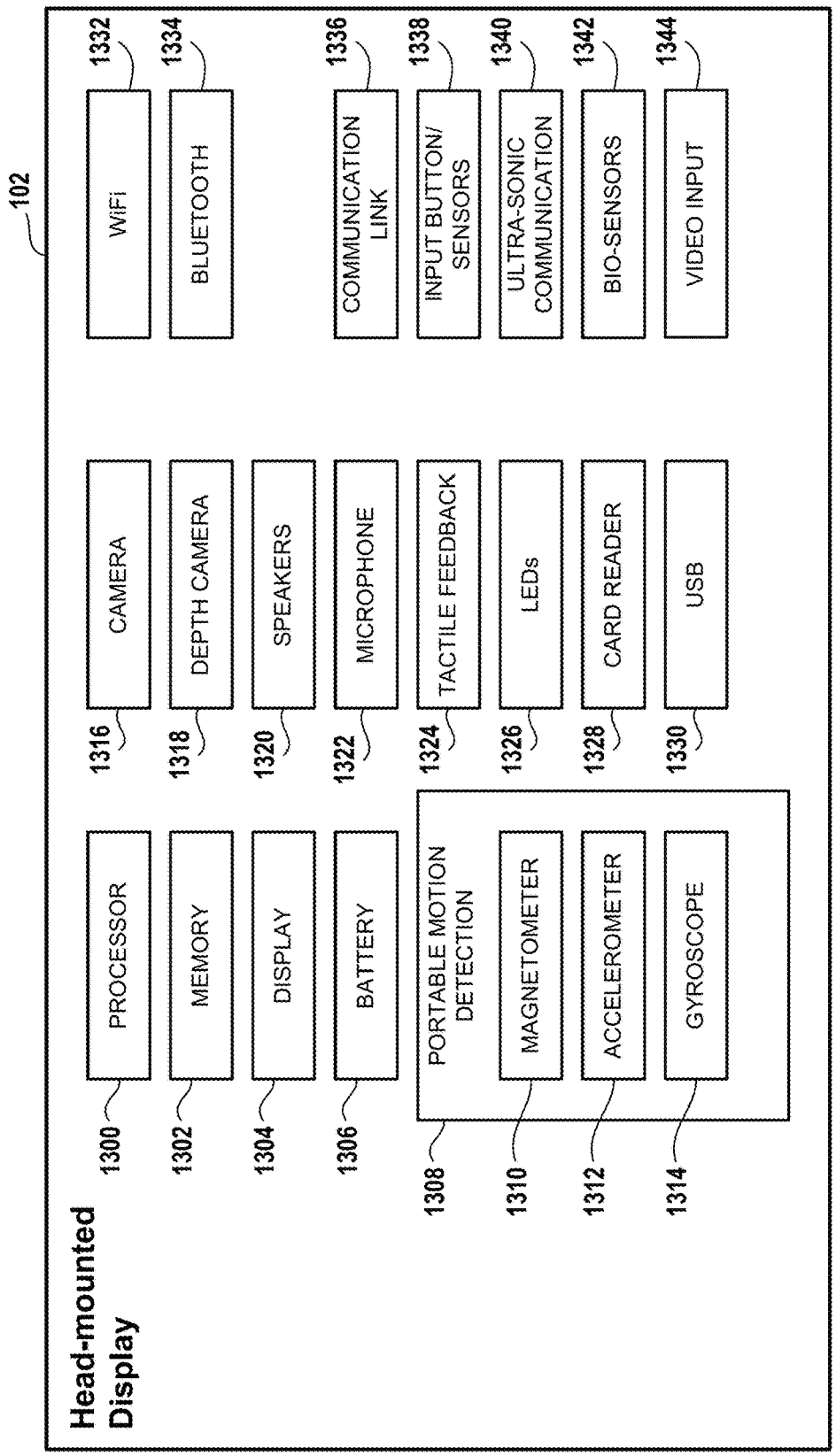
FIG. 13 illustrates components of a head-mounted display, in accordance with an embodiment of the disclosure.

With reference to FIG. 13, a diagram illustrating components of a head-mounted display 102 is shown, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 14:
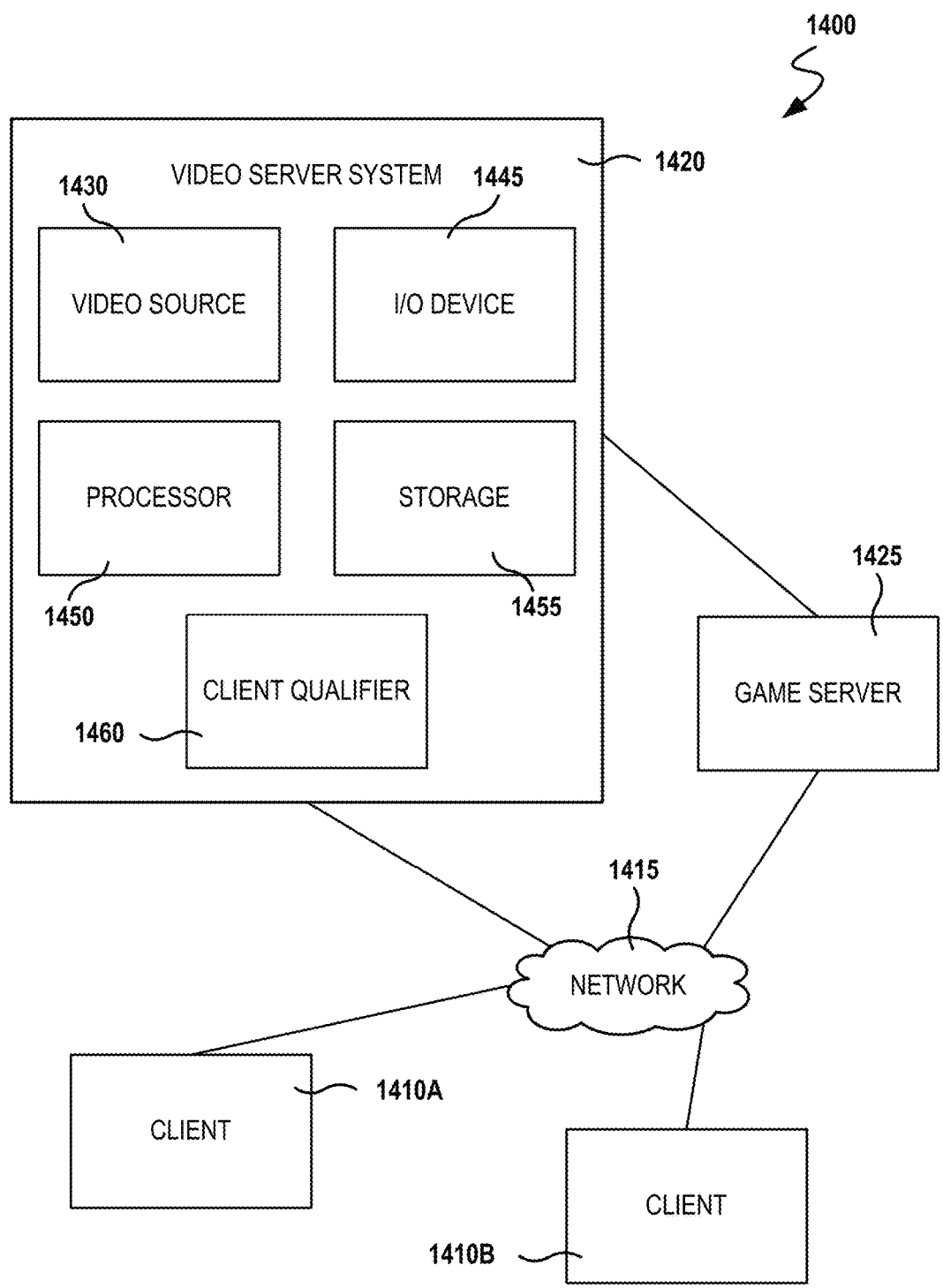
FIG. 14 is a block diagram of a Game System 1400, according to various embodiments of the disclosure.

FIG. 14 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method executed by a computer external to a head-mounted display (HMD), comprising:
receiving, by the computer, captured image frames of an interactive environment in which a HMD is disposed;
receiving inertial data processed from at least one inertial sensor of the HMD;
analyzing the captured image frames and the inertial data to track movement of the HMD and a gaze direction of a user that wears the HMD, wherein analyzing the captured image frames includes examining changes within a sequence of said captured image frames to track the movement of the HMD, wherein analyzing the captured image frames includes processing the captured image frames to identify and map one or more fixed objects in the interactive environment and tracking the one or more fixed objects to enable the tracking of the movement of the HMD;

using the tracked movement of the HMD and the gaze direction to adjust a beamforming direction of an RF transceiver towards the HMD, the RF transceiver being in a region local to the HMD in the interactive environment;

adjusting an angular spread of the RF transceiver based on the movement of the HMD and the gaze direction, wherein the angular spread increases with increasing lateral movement of the HMD relative to the RF transceiver.

2. The method of claim 1, wherein identifying the movement of the HMD includes determining a motion vector of the HMD, the beam forming direction and angular spread being adjusted based on the motion vector of the HMD.

3. The method of claim 2, wherein a magnitude of the motion vector identifies a speed of the movement of the HMD, and wherein a direction of the motion vector identifies a direction of the movement of the HMD.

4. The method of claim 2, wherein determining the motion vector includes determining an acceleration of the movement of the HMD.

5. The method of claim 1,
wherein identifying the movement of the HMD includes identifying translational movement and/or rotational movement of the HMD.

6. The method of claim 1,
wherein the RF transceiver includes a phased array of RF emitters;
wherein adjusting the beamforming direction of the RF transceiver includes generating transceiver control data that is configured to cause adjustment of a phase or amplitude of at least one of the RF emitters of the phased array.

7. The method of claim 1, wherein the at least one inertial sensor of the HMD includes one or more of an accelerometer, a gyroscope, or a magnetometer.

8. The method of claim 1,
wherein the HMD includes a plurality of sensors;
wherein analyzing the captured image frames includes identifying locations of one or more of a plurality of emitters in the captured image frames.

9. The method of claim 1, wherein the captured image frames are captured by one or more outward facing cameras of the HMD.

10. The method of claim 1, further comprising:
receiving feedback data indicating a quality of a signal transmitted by the RF transceiver;
wherein the beamforming direction and angular spread are adjusted based on the feedback data.

11. The method of claim 10, wherein the feedback data is transmitted over a different frequency band than the signal transmitted by the RF transceiver.

12. The method of claim 1, wherein the beamforming direction and angular spread are applied to transmit video data to the HMD, the video data being rendered to a display of the HMD to provide a view of a virtual environment through the HMD.

13. The method of claim 1, wherein the angular spread decreases with increasing radial distance of the HMD relative to the RF transceiver.

14. A method executed by a computer external to a head-mounted display (HMD), comprising:
receiving, by the computer, captured image frames of an interactive environment in which a HMD is disposed;
receiving inertial data processed from at least one inertial sensor of the HMD;
analyzing the captured image frames and the inertial data to track movement of the HMD HMD and a gaze direction of a user that wears the HMD, wherein analyzing the captured image frames includes examining changes within a sequence of said captured image frames to track the movement of the HMD, wherein analyzing the captured image frames includes processing the captured image frames to identify and map one or more fixed objects in the interactive environment and tracking the one or more fixed objects to enable the tracking of the movement of the HMD;
using the tracked movement of the HMD and the gaze direction to adjust a beamforming direction of an RF transceiver towards the HMD, the RF transceiver being in a region local to the HMD in the interactive environment;
adjusting an angular spread of the RF transceiver based on the movement of the HMD and the gaze direction, wherein the angular spread decreases with increasing radial distance of the HMD relative to the RF transceiver.

15. The method of claim 14,
wherein the RF transceiver includes a phased array of RF emitters;
wherein adjusting the beamforming direction of the RF transceiver includes generating transceiver control data that is configured to cause adjustment of a phase or amplitude of at least one of the RF emitters of the phased array.

16. The method of claim 15, wherein the at least one inertial sensor of the HMD includes one or more of an accelerometer, a gyroscope, or a magnetometer.

17. The method of claim 14,
wherein the HMD includes a plurality of emitters;
wherein analyzing the captured image frames includes identifying locations of one or more of the plurality of emitters in the captured image frames.

18. The method of claim 14, wherein the captured image frames are captured by one or more outward facing cameras of the HMD.

19. The method of claim 14, further comprising:
receiving feedback data indicating a quality of a signal transmitted by the RF transceiver;
wherein the beamforming direction and angular spread are adjusted based on the feedback data.

20. The method of claim 14, wherein the feedback data is transmitted over a different frequency band than the signal transmitted by the RF transceiver.

* * * * *